United States Patent
Owa et al.

(10) Patent No.: US 6,348,971 B2
(45) Date of Patent: *Feb. 19, 2002

(54) PRINTING SYSTEM AND PRINTING METHOD FOR SELECTING AN OPTIMUM PRINTING FOR PRINTING

(75) Inventors: Masahiro Owa; Susumu Shiohara; Hikonosuke Uwai, all of Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,086

(22) Filed: Jun. 19, 1998

(30) Foreign Application Priority Data

Jun. 20, 1997 (JP) .............................. 9-164281
Jan. 8, 1998 (JP) ........................... 10-002039

(51) Int. Cl.[7] .............................................. G06K 15/00
(52) U.S. Cl. ..................... 358/1.15; 358/1.13; 358/1.1; 358/1.14
(58) Field of Search ............................. 358/1.15, 1.14, 358/1.13, 1.11, 1.9, 1.6, 1.1, 407, 468, 1.16, 1.17, 1.18, 1.5, 1.4, 1.2; 400/61, 70, 76; 382/303–304; 710/8, 14, 15, 16, 17–19, 62, 64, 72

(56) References Cited

U.S. PATENT DOCUMENTS

| | | | | |
|---|---|---|---|---|
| 5,220,674 A | * | 6/1993 | Morgan et al. | 358/1.11 |
| 5,467,434 A | * | 11/1995 | Hower, Jr. et al. | 358/1.15 |
| 5,559,933 A | | 9/1996 | Boswell | 358/1.15 |
| 5,580,177 A | * | 12/1996 | Gase et al. | 358/1.15 |
| 5,978,557 A | * | 11/1999 | Kato | 358/1.15 |

FOREIGN PATENT DOCUMENTS

| | | |
|---|---|---|
| EP | 0 521 673 A2 | 7/1993 |
| JP | 09-150557 | 6/1997 |

OTHER PUBLICATIONS

Jackson et al ; "Methodology for Automated Printed Selection" IBM Technical Disclosure Bulletin vol. 36 No. 09B; p. 379, Sep. 1993.*

* cited by examiner

Primary Examiner—Dov Popovici
(74) Attorney, Agent, or Firm—Sughrue Mion, PLLC

(57) ABSTRACT

A printer selection device selects an optimum printer for printing a document based on user information indicating such conditions as print commands and specifications, and based on printer information concerning print environments of the printers and causes the optimum printer to print the document. An optimum printer can be selected for each document, or each page of a document.

48 Claims, 18 Drawing Sheets

FIG. 3

| PRINTER BASIC INFORMATION | PRN1 | PRN2 | PRN3 | PRN4 |
|---|---|---|---|---|
| INSTALLATION LOCATION | WITHIN 5m | ON DESK | ON FLOOR | ON FLOOR |
| COLOR/ MONOCHROME | MONOCHROME | MONOCHROME | MONOCHROME | COLOR/ MONOCHROME |
| PRINT SPEED | 12ppm | 6ppm | 40ppm | 2ppm |
| RESOLUTION | 1200/600dpi | 600dpi | 600dpi | 720dpi |
| PAPER TYPE | A4/B4/A3 | A4/B5 | A4/B4/A3 | A3 |
| DOUBLE-SIDED PRINT | N/A | N/A | N/A | N/A |

FIG. 4

| STATUS INFORMATION | | PRN1 | PRN2 | PRN3 | PRN4 |
|---|---|---|---|---|---|
| OPERATION STATE | | PRINTABLE | PRINTABLE | PRINTING | PRINTING |
| REMAINING PAPER AMOUNT | A4 | 0 SHEET | 10 SHEETS | 1500 SHEETS | |
| | A3 | 100 SHEETS | | 400 SHEETS | 20 SHEETS |
| | B4 | 10 SHEETS | | 400 SHEETS | |
| | B5 | | 50 SHEETS | | |
| REMAINING INK/TONER AMOUNT | | 10% | 50% | 80% | 30% |

FIG. 5

| PRINTER SELECTION CONDITIONS | USER 1 | USER 2 |
|---|---|---|
| COLOR/MONOCHROME | A | B |
| PAPER SIZE | A | B (SELECTION OF LARGER PRINTER) |
| RESOLUTION | A | C |
| DOUBLE-SIDED PRINT | C | C |
| PRINT LOCATION | C | B (CLOSER THAN 10m) |
| PRINT SPEED | C | B (HIGH SPEED MACHINE TO PRINT 10 OR MORE SHEETS OF PAPER) |
| REMAINING PAPER AMOUNT | A | C |

FIG. 9a

PRINTER STATE MANAGEMENT TABLE 51

| PRINTER NAME | PRINT TECHNOLOGY | COLOR | PRINT RESOLUTION | PRINT SPEED | FED PAPER SIZE | FONT | OPTION |
|---|---|---|---|---|---|---|---|
| PRN11 | INK JET TYPE | COLOR | 720 * 720 | 5ppm | A4・A3 | Fa・Fb・Fc | N/A |
| PRN12 | LASER TYPE | COLOR | 360 * 360 | 2ppm | A4 | Fc・Fd | AVAILABLE |
| PRN13 | LASER TYPE | MONOCHROME | 600 * 600 | 15ppm | A4・A3 | Fa・Fb・Fc | AVAILABLE |
| PRNn | LASER TYPE | MONOCHROME | 600 * 300 | 20ppm | A4・B4 | Fa・Fc | N/A |

FIG. 9b

MODULE CONFIGURATION INFORMATION MANAGEMENT TABLE 52

| PRINTER NAME | MODULE CONFIGURATION INFORMATION | | | |
|---|---|---|---|---|
| PRN11 | EXECUTION MODULE M1 | EXECUTION MODULE M2 | EXECUTION MODULE M3 | |
| PRN12 | EXECUTION MODULE M4 | EXECUTION MODULE M5 | EXECUTION MODULE M6 | EXECUTION MODULE M7 |
| PRN13 | EXECUTION MODULE M4 | EXECUTION MODULE M5 | | EXECUTION MODULE M7 |
| PRNn | EXECUTION MODULE M4 | EXECUTION MODULE M5 | | |

DETERMINATION TABLE

| PRINTER NAME | PRINT TECHNOLOGY | COLOR | PRINT RESOLUTION | PRINT SPEED | FED PAPER SIZE | FONT | OPTION |
|---|---|---|---|---|---|---|---|
| PRN11 | 1 | 1 | 1 | 0 | 1 | 1 | |
| PRN12 | 1 | 1 | 0 | 0 | 1 | 1 | |
| PRN13 | 1 | 1 | 1 | 1 | 1 | 1 | ← SELECT |
| PRNn | 0 | 0 | 1 | 1 | 1 | 1 | |

PRINTING SYSTEM AND PRINTING METHOD FOR SELECTING AN OPTIMUM PRINTING FOR PRINTING

BACKGROUND OF THE INVENTION

1. Field of the Invention

This invention relates to a printing system and a printing method for enabling a particular printer to be selected from among many printers connected to a host computer. The present application is based on Japanese Application Nos. Hei. 9-164281 and Hei. 10-2039 which are incorporated herein by reference.

2. Description of the Related Art

Conventionally, a printing system comprising printers connected to a host computer can be constructed by using a communication network such as a LAN (Local Area Network). In such a printing system, the user must select one printer to use for printing from among many printers. Thus, the user selects a printer, which has been determined by the user as optimum, from among the many printer icons displayed through a GUI (Graphics User Interface) of the host computer.

The user can select any desired printer from among the printers connected to the network and command the printer to print. However, the printers differ in print engine type such as ink jet or laser, color print function availability, print speed, and print resolution. Therefore, the user needs to understand the specifications and functions of the printers before selection. For example, to print a color document for presentation, a color printer needs to be selected or, to execute an urgent trial print, the user needs to select a fast printer which is closeby.

If a small number of printers are connected to the network, the user can keep track of the specifications of the available printers rather easily. However, if a large number of printers are connected to the network or a printer is replaced, it becomes difficult for the user to accurately keep track of the specifications, functions, installation locations, etc., of the printers.

Therefore, an increasingly growing number of users utilize only a specific printer to which they happen to be familiar, although various printers can be used. If the specific printer which a user always utilizes is busy, the user tends to wait until the desired busy printer becomes idle even though other available printers exist. Further, if it becomes necessary to execute a special print that cannot be performed by the specific printer that the user normally uses, the user must find another printer. In this case the user tends to devote a lot of time and effort to checking a large number of printers for the desired specifications and performance and to selecting the printer provided with all the required functions.

In addition, in recent years, documents have been increasingly diversified, thus conventional printing of the whole document at one printer is a wasteful operation and lowers the printing efficiency of the printing system. For example, when a document contains some color graphics data pages, a color printer must be selected even if most of the document is monochrome text data. Likewise, when high-resolution image data is contained in a part of a document, a high-resolution printer must be selected even if most of the document is text data that can be printed at low print resolution. In summary, since a high-level function printer must be selected for specific print pages, print jobs may concentrate on a specific printer, and thus, efficiency of the entire network printing system lowers.

It is therefore an object of the invention to provide a printing system and a printing method that can select an optimum printer for printing from among the printers connected to a host computer and enable effective use of the printers without the need for the user to keep track of the performance and specifications of available printers. It is another object of the invention to provide a printing system and a printing method which enable improvement in print efficiency by selecting an optimum printer for each print page. Other objects and advantages of the invention will be apparent from the following detailed description.

SUMMARY OF THE INVENTION

The present invention provides a printing system comprising a plurality of printers and a host computer that can selectively drive the printers. User information retention means retains user information concerning printing which is set by a user and printer information retention means retains printer information concerning print environments of the printers. Printer selection means selects a printer which satisfies the selection criteria from among the printers based on the user information retained in the user information retention means and the printer information retained in the printer information retention means and controls the host computer so as to drive the selected printer.

BRIEF DESCRIPTION OF THE DRAWINGS

The above objective and advantages of the present invention will become more apparent by describing in detail a preferred embodiment thereof with reference to the attached drawings in which:

FIG. 3 is an illustration to show an example of basic information on printers;

FIG. 4 is an illustration to show an example of printer status information;

FIG. 5 is an illustration to show an example of printer selection conditions;

FIGS. 9a and 9b show examples of tables referenced for configuring a printer driver in response to the printer state; 9a shows a printer state management table and 9b shows a module configuration information management table;

FIG. 12a shows a printer selection condition entry screen and 12b shows a screen requesting the user to approve the printer selection result;

DESCRIPTION OF THE PREFERRED EMBODIMENT

First Embodiment

Figure 1:
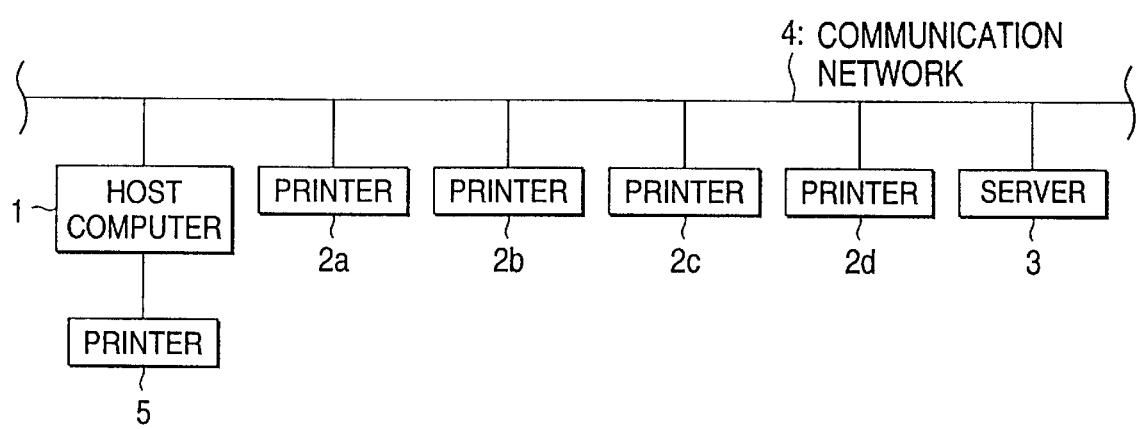
FIG. 1 is a block diagram to show a general configuration of a printing system according to the invention.

FIG. 1 shows schematically a general configuration of a printing system of the invention. One or more host computers 1 (only one shown), printers 2a, 2b, 2c, and 2d, and one communication server 3 (not necessarily required) exist on a communication network 4, such as a LAN. A local printer 5 is also connected to the host computer 1 by a predetermined interface cable.

Figure 2:
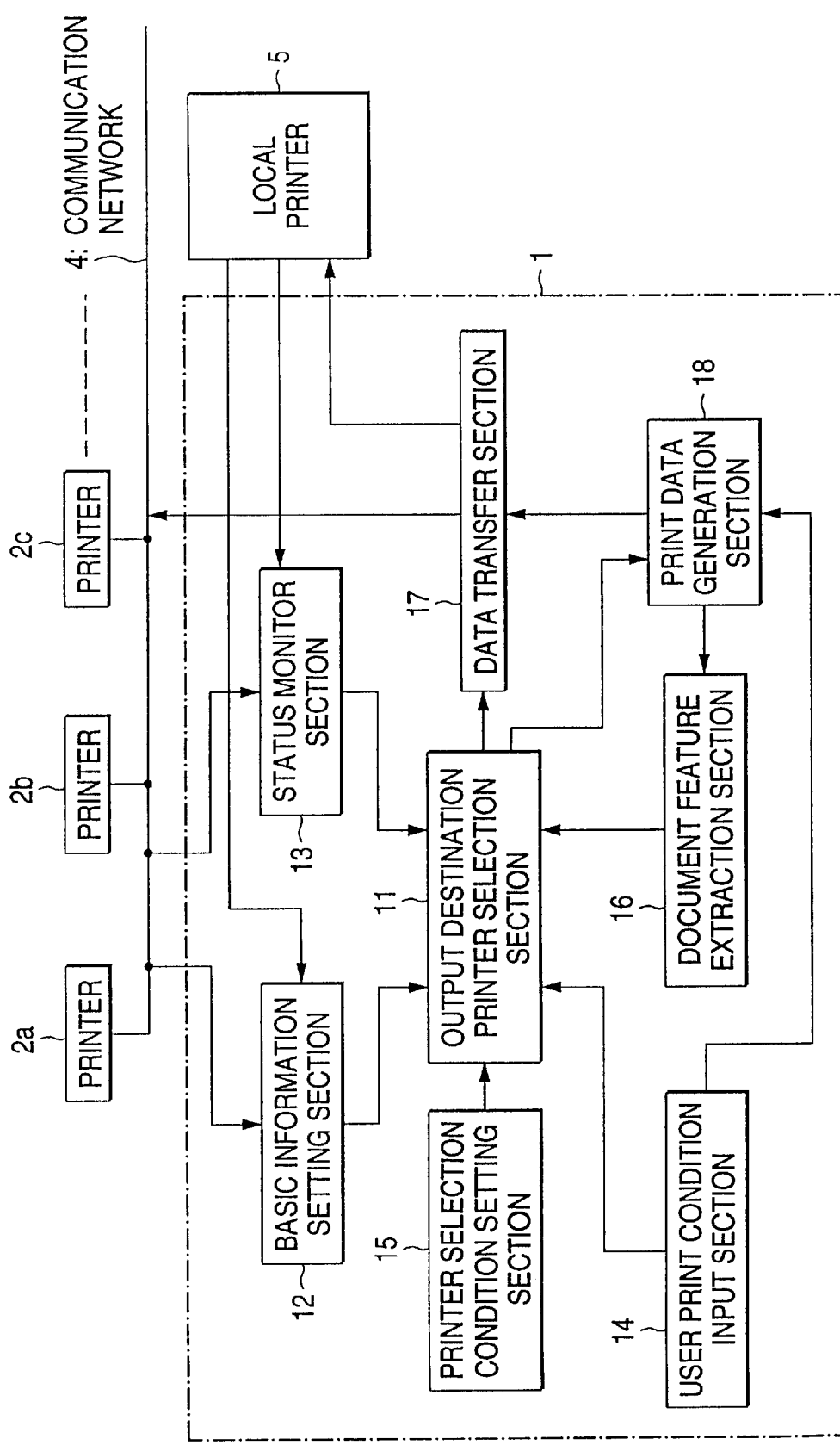
FIG. 2 is a block diagram to show a function configuration for printer control installed in the host computer shown in FIG. 1.

FIG. 2 is a block diagram to show a function configuration for printer control installed in the host computer 1. The host computer 1 comprises an output destination printer selection section 11, a basic information setting section 12, a status monitor section 13, a user print condition input section 14, a printer selection condition setting section 15, a document feature extraction section 16, a data transfer section 17, and a print data generation section 18. These blocks typically can be provided by software. For example, the user print condition input section 14, the print data generation section 18, and the data transfer section 17 can be provided by software generally referred to as a "printer driver." Other blocks 11–13 and 16 can also be built in the printer driver together with the blocks 14, 17, and 18 or can be provided as software separate from the printer driver. For example, blocks 11–13 and 16 may be provided by programs called "printer utilities" or the like. At least one of the blocks, for example, the status monitor section 13, may be a resident program.

The output destination printer selection section 11 is provided for automatically selecting a print data output destination from among the printers 2a, 2b, 2c, and 2d on the network 4 and the local printer 5. When selecting an output destination printer, the output destination printer selection section 11 references information which is retained in the basic information setting section 12, the status monitor section 13, the user print condition input section 14, the printer selection condition setting section 15, and the document feature extraction section 16.

The basic information setting section 12 obtains the basic information of the performance, specifications, etc., of the printers 2a, 2b, 2c, and 2d on the network 4 and the local printer 5 and retains the basic information. The basic information contains items not frequently changed, such as:

(1) model names;

(2) performance (print speed, color/monochrome, print resolution, installed RAM capacity, contained font types, control command level, installed hard disk capacity, etc.,);

(3) additional functions (double-sided print function, options of sorter, stapler, puncher, etc.,); and (4) installation locations (location names, distances to locations, etc.,).

The user (or system administrator, etc.,) can also manually enter the contents of the items in the basic information setting section 12 or the basic information setting section 12 can send an inquiry about information known by the printer itself, such as the model name, the performance, and the additional functions, to each printer and automatically receive an answer from the printer.

The status monitor section 13 monitors the status of each printer 2a, 2b, 2c, 2d, 5 and retains the most recent status information. The status information contains items, such as:

(1) operation state (printing, power saving state, error state, data amount waiting for print, etc.,); and (2) consumable state (paper size, paper type, remaining paper amount, remaining toner amount, remaining ink amount, etc.,).

Since the status information frequently changes, the status monitor section 13 may be configured as resident software as mentioned above so as to be able to obtain the most recent status information whenever necessary.

At the time for printing, the user enters print conditions in the user print condition input section 14, which then retains the print conditions. The user print conditions contain items, such as:

(1) image quality (color/monochrome, print resolution, number of gray levels, color correction, etc.,);

(2) paper (paper size, paper type, etc.,); and (3) additional functions (double-sided print function, scaling, sort, staple, punch, etc.,).

The printer selection condition setting section 15 retains user-preset printer selection conditions. The printer selection conditions contain items, such as:

(1) printer condition items contained in selection range (color/monochrome, paper size, print resolution, installation location, print speed, etc.,); and (2) condition item priority or importance.

The document feature extraction section 16 extracts and retains document feature information indicating the document features from printed document data input from an application program (not shown) through an operating system to the print data generation section 18. The document feature information contains items, such as:

(1) number of pages or whether the number of pages is large or small; and (2) image complicity and presence or absence of photos or graphics.

The print data generation section 18 uses printer control commands that can be interpreted by the printer selected by the output destination printer selection section 11 to generate print data of a document transferred from an application program. The data transfer section 17 passes the print data generated by the print data generation section 18 to the operating system of the host computer 1, for transferring the print data to the printer selected by the output destination printer selection section 11.

FIG. 3 shows an example of the basic information of printers retained in the basic information setting section 12. In FIG. 3, installation location, color/monochrome, print speed, print resolution, paper type, and double-sided print availability are set as the basic information for each of four printers identified as names PRN1 to PRN4 for identifying printers 2a to 2d.

FIG. 4 shows an example of the status information retained in the status monitor section 13. In the figure, operation state, paper size and remaining paper amount, and remaining ink/toner amount are set as the status information for each of the four printers identified as names PRN1 to PRN4.

FIG. 5 is an illustration of an example of the printer selection conditions set in the printer selection condition setting section 15. In the figure, the condition items of color/monochrome, paper size, print resolution, double-sided print, print location, print speed, and remaining consumable amount and user-specified priority for each of the condition items (A, B, or C) are set as the printer selection conditions for each of the two users of user 1 and user 2. The priority A means that the corresponding criteria must always be satisfied. If none of the printers can satisfy the criteria assigned priority A, the host computer 1 warns the user. The priority B means that preferably the corresponding condition item is satisfied. The user can also set an alternative condition applied when each condition item assigned priority B is not satisfied. The alternative conditions set by the user are enclosed in parentheses in FIG. 5. The priority C is assigned to an item which is not specified by the user and need not necessarily be satisfied. User 1 shown in FIG. 5 is a user who wants to accurately print a text document. User 1 specifies priority A for the print quality, thereby setting the conditions so as to be able to reliably print on paper of specified size with high quality. On the other hand, user 2 is a user who wants to frequently print and immediately check the document contents, for example. User 2 makes the most of priority B, thereby setting the conditions so as to be able to print at a printer satisfying desirable conditions as much as possible while shortening the wait time.

Next, the operation of the host computer 1 at the printing time will be discussed with reference to a flowchart of FIG. 6, wherein YES of the determination result is abbreviated to Y and NO is abbreviated to N.

To print, the user calls up the printer driver and sets desired print conditions on the GUI at step S1. The setup print conditions are retained by the user print condition input section 14. Upon completion of the setting step, the user enters a print execution command at step S2. Then, the output destination printer selection section 11 obtains the basic information on the printers as illustrated in FIG. 3, retained in the basic information setting section 12, the printer selection conditions preset by the user as illustrated in FIG. 5, set in the printer selection condition setting section 15, and the user print conditions set in the user print condition input section 14 at step S3. It compares the user print conditions with the basic information on the printer in accordance with the priority assigned in the printer selection conditions as follows:

First at step S4, the output destination printer selection section 11 determines whether or not the printer selection conditions contain a condition item assigned priority A (shown as A item in the figure). If a condition item assigned priority A does not exist, control goes to step S10; if a condition item assigned priority A exists, control goes to step S5. At step S5, the output destination printer selection section 11 checks whether or not the basic information on each printer can satisfy the user print condition for each condition item assigned priority A. A printer which does not comprise the basic information satisfying the user print condition assigned priority A is excluded at step S6 so that it is not selected. For example, if the condition item "color/monochrome" is assigned priority A and the user print condition is "color," monochrome printers are excluded so that they are not selected. The sequence is repeated for all condition items assigned priority A. If all condition items assigned priority A have been handled at step S7 (YES), control goes to step S8.

Then, at step S8, the output destination printer selection section 11 checks whether or not a printer not excluded remains, in other words, whether one or more printers can satisfy the user print conditions for all items assigned priority A. If there are no printers to be selected, control goes to step S9 for displaying a message to the user indicating that none of the printers can be selected. Then, control returns to step S1 and waits for the user to again enter user print conditions.

If it is determined at step S8 that one or more printers are to be selected, information concerning the printer selection range narrowed down according to the condition items assigned priority A is retained, then control goes to step S10 so that the output destination printer selection section 11 can check whether or not a condition item assigned priority B exists in the printer selection conditions. If a condition item assigned priority B does not exist, control goes to step S16; if a condition item assigned priority B exists, control goes to step S11. At step S11, the output destination printer selection section 11 checks whether or not the basic information on each printer to be selected can satisfy the user print condition for each condition item assigned priority B. If NO is returned at step S11, control goes to step S12 to check if an alternative condition is set in the condition item assigned priority B for which NO is returned at step S11, and whether or not the basic information on the printer satisfies the alternative condition. For example, if the condition item "paper size" is assigned priority B and the paper size set in the user print condition is "IB4" and "print scaled to A4 size may be selected" is set as the alternative condition, NO is returned at step S11, but YES is returned at step S12 for a printer provided with only paper of A4 size or less.

At step S13, a high score is given to the printer for which YES is returned at step S11. At step S14, a low score is given to the printer for which YES is returned at step S12. The scores given to each printer are totaled and retained. The sequence is repeated until all condition items assigned priority B have been handled at step S15 (YES). Then, the total score indicating the degree to which each printer to be selected satisfies the condition items assigned priority B is given to the printer.

Next, at step S16, the output destination printer selection section 11 corrects the total score of each of the printers to be selected based on the document features retained in the document feature extraction section 16. For example, if the document has a large number of pages, a higher added score can be given to a printer which operates at a high print speed so that a high-speed printer is preferentially selected. Also, if the document contains a complicated image, a higher added score can be given to a printer having a high-level command processing capability so that the score of the high-level command processing printer is increased. The total score that each printer gains is thus corrected at step S16 in response to the document features.

Next, at step S17, the output destination printer selection section 11 references the status information of each of the printers to be selected to check whether or not each printer can actually print, and excludes the printers which are in a print-impossible state. For example, the output destination printer selection section 11 excludes a printer in a print-impossible state, i.e. a printer that is not of a desired size, a printer which is out of ink, or a printer that stops in an error state. A printer which is currently printing can be restored to a printable state upon completion of the current printing, and thus, is not excluded. However, for example, to reflect the condition that the current printer which is printing cannot be selected immediately, the total score of the printer is reduced, so that the current status of the printer is reflected on the total score and a more available printer can be selected as an optimum printer.

Next, at step S18, the output destination printer selection section 11 checks whether or any of the printers to be selected remain. If no printers to be selected remain, control goes to step S9 and a message is displayed indicating this status. If one or more printers to be selected remain, control goes to step S19 wherein the printer having the highest final score is selected as an optimum printer from among the printers determined to be selected. If several printers gain the same highest score, one of them is selected as an optimum printer based on a proper criterion, such as the printer name order, ascending order of the number of printer operation times, identification number order, or preset priority.

If an optimum printer is thus selected, then at step S20, the print data generation section 18 uses control commands that can be interpreted by the selected optimum printer to generate print data. At step S21, the data transfer section 17 passes the generated print data to the operating system for transferring the printer data to the optimum printer. At the same time, at step S22, the data transfer section 17 displays the optimum printer to which the print data is sent on the GUI of the printer driver, informing the user at which of the printers connected to the network the document is being printed.

According to the embodiment, if the user does not know the performance or specifications of each printer, he or she simply sets print conditions on the GUI of the printer driver, whereby the printer that can best satisfy the user's needs is selected automatically. For example, assume that in an environment where four printers PRN1–PRN4 exist as shown in FIG. 3, user 1 shown in FIG. 5 sets print conditions of "monochrome," "A4," "600 dpi," and "no double-sided print" and issues a print execution command of a 20-page document. In this case, the printer PRN4 of the four printers PRN1–PRN4 is excluded because it can not satisfy any of the print conditions assigned priority A, "monochrome," "A4," and "600 dpi." Further, the status information shown in FIG. 4 is referenced and printers PRN1 and PRN2 that cannot print 20 pages, the document feature, are excluded because not enough A4-size paper remains. Finally, the printer PRN3 is selected as an optimum printer.

In this case, the printer PRN3 is printing as shown in FIG. 4. Thus, the printing for user 1 is delayed until the current printing job is complete. If the remaining A4-size paper amount in the printer PRN2 is 20 sheets or more in the status information shown in FIG. 4, the printer PRN2 rather than the printer PRN3 will be selected as an optimum printer (the printer PRN3, which is printing, gains a lower score than the printer PRN2).

Thus, the print request of user 1 is accurately executed under the print conditions specified by user 1 and the user 1 needs can be satisfied. On the other hand, when user 2 shown in FIG. 5 issues a print execution command of the same document as user 1 under the same print conditions, a printer comprising the basic information better satisfying the condition items assigned priority B can gain a higher score, but the printer PRN2 will gain the highest score and the printer PRN1 will gain the second highest score with respect to the print location and the printer PRN3 will gain the highest score and the printer PRN1 will gain the second highest score with respect to the print speed. Finally, the printers PRN1 to PRN3 will almost match with the same highest score. With respect to the status information shown in FIG. 4, the printer PRN2 with the remaining paper amounting to less than the print condition is excluded and the score of the current printer PRN3 which is currently printing is reduced; thus, the printer PRN1 will be selected. If the printer PRN3 is not printing, the faster printer PRN3 may be selected over the printer PRN1. In summary, the printer most satisfying the conditions desired by user 2, i.e., a printer installed at a close location and operating at high speed, is selected automatically. Thus, the user can handle a number of printers advantageously and efficiently.

Second Embodiment

A second embodiment of the invention will be discussed with reference to FIGS. 7–17. The second embodiment is characterized by the fact that an optimum printer is selected in page units and that print data generation means can be configured variably in response to an optimum printer. Thus, an optimum printer can be selected for each page of a document, rather than selecting the printer for the document as a whole as in the first embodiment.

Figure 7:
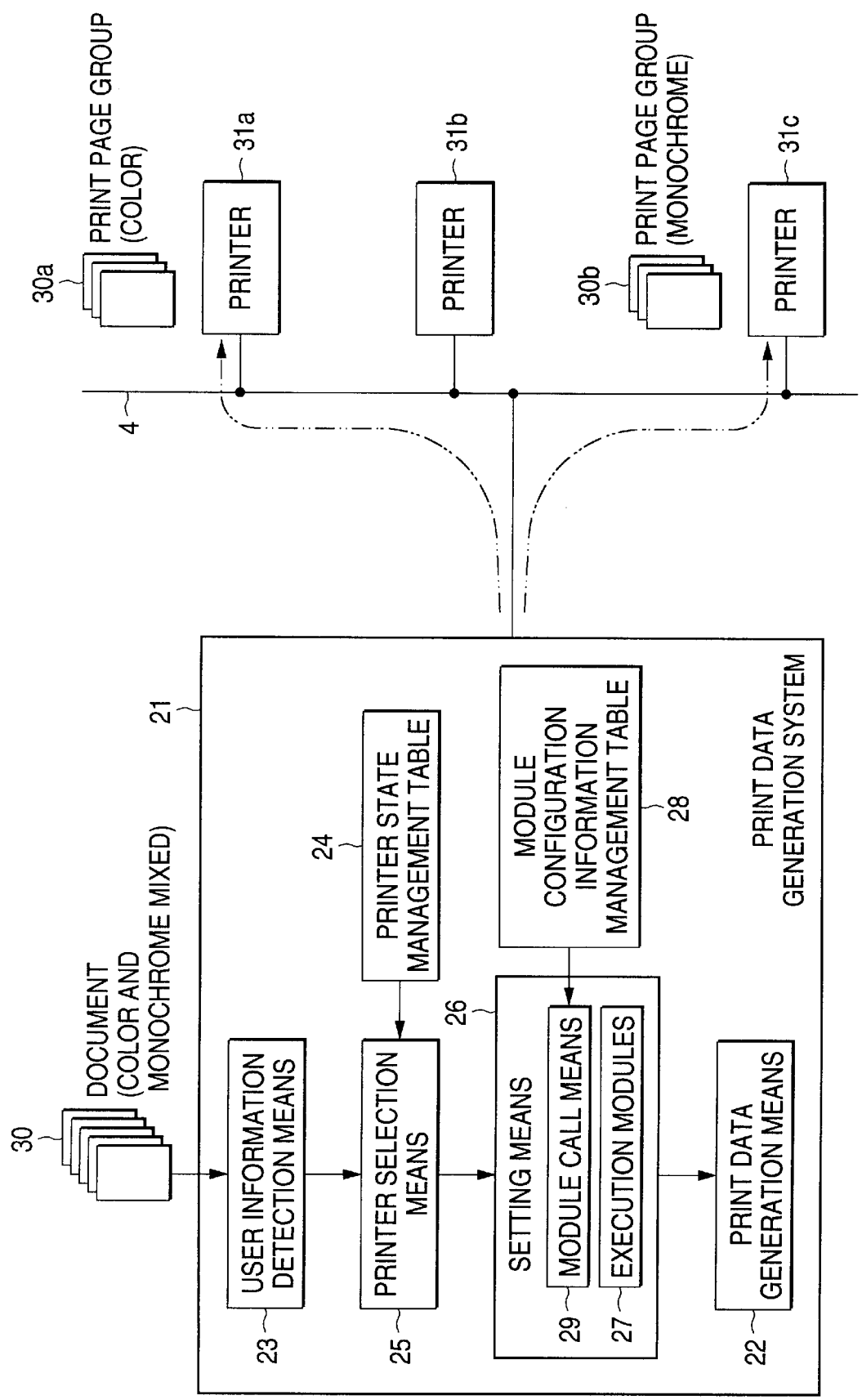
FIG. 7 is a functional block diagram to schematically show the function configuration of a second embodiment of the invention.

FIG. 7 is a functional block diagram to show an outline of a printing system according to the second embodiment of the invention. A print data generation system 21 is provided, for example, in a host computer comprising print data generation means 22 for generating print data, user information detection means 23 for detecting and retaining user information for each print page based on at least specified print contents (user print conditions and document features), a printer state management table for storing and managing the printer state of printers 31a–31c (basic information and status information), printer selection means 25 for selecting a printer appropriate for printing each print page based on the printer state of each printer 31a–31c and the user information, and setting means 26 for setting the print data generation means 22 to relate the means to the printer selected by the printer selection means 25.

When a document print command is entered, the user information detection means 23 detects user specifications, i.e., color or monochrome print, print resolution, presence or absence of image data, used font type, etc., for each print page based on user-set or entered information and document features. The printer selection means 25 selects a printer appropriate for printing for each print page based on the printer state of each printer 31a–31c and the user information.

Thus, the printer selection means 25 collates the user information with the printer state of each available printer and selects a printer appropriate for printing for each print page in such a manner that a color printer is assigned to a color print page and that a monochrome printer is assigned to a monochrome print page. The setting means 26 sets the print data generation means 22 so as to relate the means to each of the selected printers. Each print page is converted into print data by the print data generation means 22 so that it is printed at an appropriate printer.

Document data is sorted into one or more print page groups in response to the user information and is converted into print data for each print page group, then the print data is transmitted to an appropriate printer. For example, if a document 30 contains color and monochrome print pages, it is sorted into a print page group 30a consisting of color print pages and a print page group 30b consisting of monochrome print pages by the printer selection means 25. The setting means 26 sets the print data generation means 22 so that the print data generation means 22 can be related to each of the printers 31a and 31b for printing the print page groups 30a and 30b. For example, the setting means 26 calls the print data generation means 22 related to the selected printer from a storage unit or requests the selected printer to transfer the print data generation means 22, thereby setting the print data generation means 22 appropriate for the selected printer. Then, the print page group 30a is printed at the color printer 31a and the print page group 30b is printed at the monochrome printer 31c.

The setting means 26 can comprise execution modules 27 for using the print functions of the printers 31a–31c and module call means 29 for calling the execution modules 27 requested by a selected printer based on a module configuration information management table 28. The expression "print functions of printers" is used to mean print processing functions that can be executed by the printers, such as a color print function, a page print function, a high-density print function, a double-sided print function, and a staple function. The "execution modules" are execution programs to use the print functions. Specifically, for example, to use a monochrome page printer, which has a print function in page units, a monochrome image print function, etc., an execution module for generating print data in page units, an execution module for generating monochrome print data, and the like become necessary.

The module call means 29 calls the execution modules 27 required for a selected printer to execute the print functions, thereby configuring the print data generation means 22 corresponding to the selected printer. Since the print data generation means 22 set for each printer is made up of a number of execution modules, some execution modules can be replaced for setting the optimum print data generation means 22. For example, if the color printer 31a and the monochrome printer 31c are both page printers, the execution module for printing in page units is shared by the printers 31a and 31c. Therefore, to change the print data generation means 22 for the monochrome printer 31c to the print data generation means 22 for the color printer 31a, some execution modules may be added or replaced.

Figure 8:
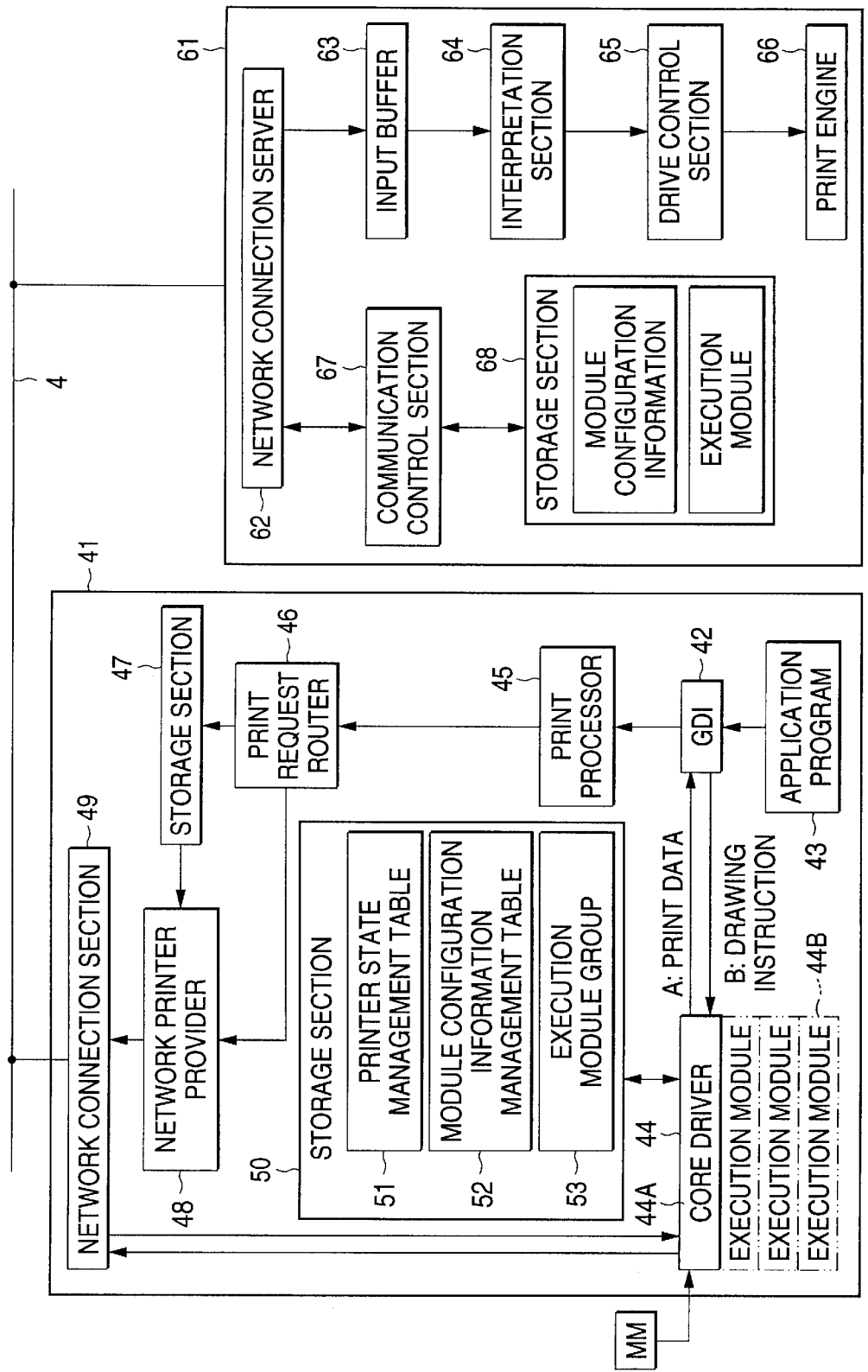
FIG. 8 is a block diagram of a printing system according to the second embodiment of the invention.

FIG. 8 is a more specific block diagram of the printing system according to this embodiment.

A print data generation system 41 comprises a graphics device interface 42, a printer driver 44, a print processor 45, a print request router 46, a storage section 47, a network printer provider 48, a network connection section 49, and another storage section 50.

The graphics device interface (GDI) 42 is an application program interface (API) for executing data communication between an application program 43 and a printer 61, which is described later, provided for managing graphics elements. The GDI 42 is operatively associated with a device independent bit map (DIB) engine (not shown) for generating image data.

The printer driver 44 generates print data to be output to the printer 61. It is connected to the GDI 42 and converts image data into print data that can be interpreted by the printer 61 in response to a drawing instruction from the GDI 42.

The printer driver 44 is made up of a core driver 44A and execution modules 44B designated by the core driver 44A. The core driver 44A designates required execution modules specified by module configuration information from an execution module group 53 in the storage section 50 and loads the execution modules into memory, thereby providing a functional configuration fitted to a selected printer. Thus, the core driver 44A itself does not comprise a print data generation function, but rather designates and connects necessary execution modules, thereby configuring the optimum printer driver 44.

The print data generated by the printer driver 44 is input via the GDI 42 to the print processor 45 via which the print data is input to the print request router 46. The print processor 45 functions as a buffer for transferring the print data.

The print request router 46 routes print data to its transfer destination. For example, the print request router 46 stores print data in a spool file in the storage section 47 or transfers the print data stored in the spool file to the network printer provider 48. The print request router 46 stores the generated print data in the spool file in the storage section 47 and when it is time to print the print data, in order to transmit the print data in the storage section 47 to the selected printer 61, the print request router 46 transfers the print data to the network printer provider 48 together with the network address, etc., of the printer 61. The network printer provider 48 functions as an interface for transferring the print data to the network connection section 49 and the print data input to the network printer provider 48 is transmitted through the network connection section 49 to the selected printer 61.

The network connection section 49 is provided for two-way communication with the printer 61 over a communication network 4; specifically, for example, it comprises protocols including TCP/IP (Transmission Control Protocol/Internet Protocol), etc.

The storage section 50 stores a printer state management table 51, a module configuration information management table 52, and the above-mentioned execution module group 53 comprising a plurality of execution modules.

As shown in FIG. 9a, the printer state management table 51 records print technology, printable color mode, print resolutions print speed, fed paper size, installed font type, option availability, etc., for each of the printers (PRNs) connected to the communication network 4. The print technology includes electrophotography (laser), ink jet, thermal transfer, impact dot matrix, sublimation, etc. Color or monochrome print is indicated under the column "COLOR" as the printable color mode in FIG. 9. The specifications and functions of the printers connected to the network can be known by looking up in the printer state management table 51.

As shown in FIG. 9b, the module configuration information management table 52 stores module configuration information for each printer (PRN). The module configuration information acts as a design instruction of a specific functional configuration of the printer driver 44. The execution module names corresponding to the print functions are described in the module configuration information.

The print functions may include a color print function, a page print function, a high-density print function, a double-sided print function, etc. The print functions of each printer vary depending on the specifications, etc., of the printer. For example, a monochrome page printer has a print function in page units, a monochrome image data print function, etc., and a color ink jet printer has a serial print function, a monochrome image print function, a color image print function, etc.

The module configuration information indicates the execution modules for providing the print functions. The execution module is a program for each print function. For example, to use the print function in page units, the execution module for generating print data in page units is required; to use the color image print function, the execution module for generating color image data is required.

The execution module group 53 is a module library storing a plurality of execution modules. The following execution module registration methods in the execution module group 33 are available. First, only main execution modules are previously stored and if any execution module other than the basic execution modules is requested, a new execution module is obtained by retrieving the resources on the network, etc., and is added to the execution module group 53. In this first method, the main execution modules are previously provided, so that the printer driver 44 corresponding to a general printer which is widely available can be configured promptly. Second, no execution modules are previously stored in the execution module group 53 and only necessary execution modules are stored by retrieving the resources on the network, etc. In this second method, only the necessary execution modules are accumulated in response to the print environment that can be used by the user, thus unnecessary execution modules are not stored, and the memory resources can be used efficiently.

The core driver 44A designates the required execution modules from the execution module group 53 by looking up the module configuration information in the module configuration information management table 52 and loading the execution modules into memory, whereby the printer driver 44 optimum for a selected printer can be configured.

Referring again to FIG. 8, the configuration of the printer 61 will be discussed. The printer 61 comprises a network connection section 62, an input buffer 63, an interpretation section 64, a drive control section 65, a print engine 66, a communication control section 67, and a storage section 68.

The network connection section 62 is provided for two-way communication with the print data generation system 41 through the communication network 4, similar to the network connection section 49 of the print data generation system 41.

The input buffer 63 temporarily stores print data input from the print data generation system 41 and the interpretation section 64 interprets the print data and converts it into bit image data. The drive control section 65 controls driving the print engine 66 based on the print data. The print engine 66 forms dots, etc., on paper for printing.

The communication control section 67 is provided for two-way communication with the core driver 44A. It transmits module configuration information in response to a request from the core driver 44A and execution modules in response to a request from the core driver 44A.

The module configuration information corresponding to the printer 61 and all or some of the execution modules specified by the module configuration information are stored in the storage section 68 made of memory, such as a hard disk unit, for example. The module configuration information stored in the storage section 68 contains information on the execution modules required for using the print functions of the printer 61.

The following two execution module storing methods in the storage section 68 are available. First, all the execution modules required for the printer 61 are stored in the storage section 68. Second, only some of the execution modules required for the printer 61 to execute the print functions are stored in the storage section 68. In the first method, all the necessary execution modules are previously stored, thus the printer does not depend on the contents of the execution module group 53 in the print data generation system 41, but consumes an increased amount of memory of the storage section 68. In the second method, only some execution modules, preferably only featuring execution modules are stored, thus amount of memory of the storage section 68 which is consumed is decreased, although basic execution modules other than the execution modules in the storage section 48 need to be previously stored in the execution module group 53 in the print data generation system 41.

Figure 10:
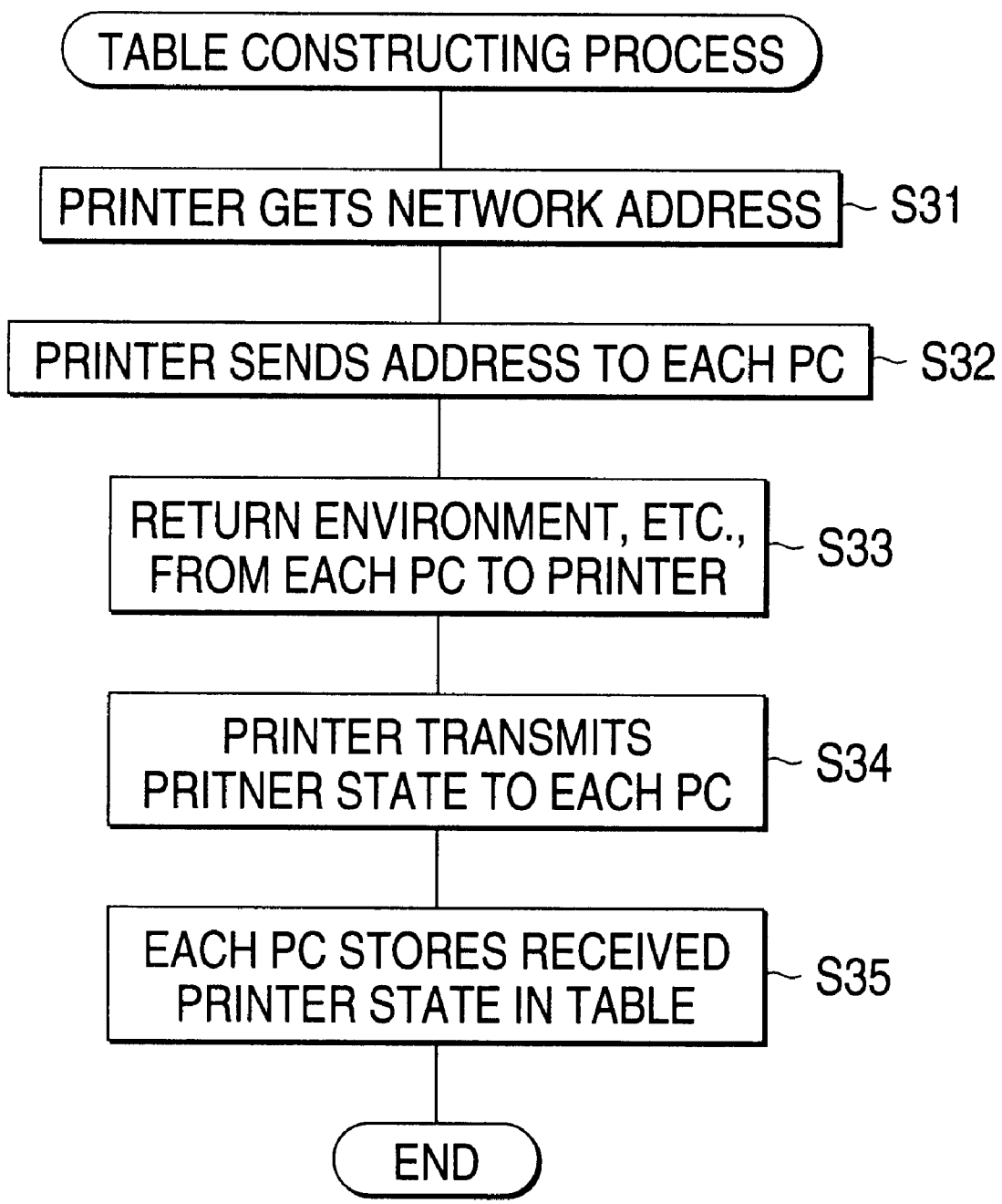
FIG. 10 is a flowchart to show a table constructing method.

FIG. 10 is a flowchart to show a process for constructing the printer state management table 51 and the module configuration information management table 52. For convenience, construction of the printer state management table 51 is taken as an example.

For example, when a new printer 61 is connected to the network 4, it gets a network address at step S31 and transmits the address to each print data generation system 41 (shown as "PC" in FIG. 10) on the network at step S32. Notification sent from the printer 61 to each print data generation system 41 is described, for example, in an architecture neutral language and can be broadcasted.

Each print data generation system 41, which receives the network address from the printer 61, replies with an environment of the operating system type, etc., to the printer 61 at step S33. The printer 61 transmits the printer state information in the format responsive to the operating system environment, etc., of each print data generation system 41 at step S34. Last, each print data generation system 41, which receives the printer state information from the printer 61, stores the received information in the printer state management table 51.

The construction of the module configuration information management table 52 is accomplished in a similar manner, except the information transmitted from the printer 61 to each print data generation system 41 at step S34 is replaced with module configuration information. If both the printer state and module configuration information are transmitted to each print data generation system 41, the printer state management table 51 and the module configuration information management table 52 can be constructed simultaneously.

Figure 11:
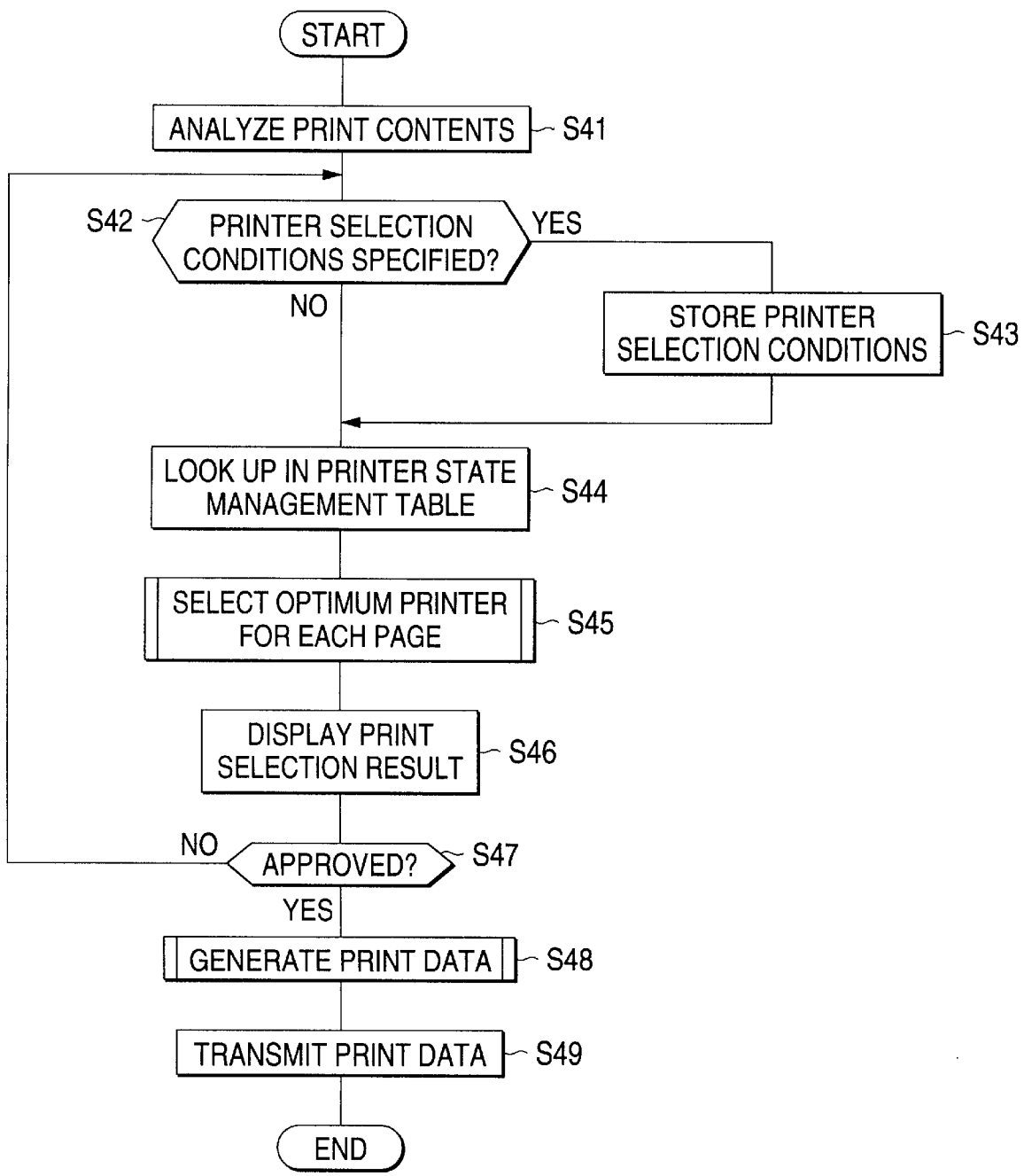
FIG. 11 is a flowchart to show whole print processing of a host computer.

FIG. 11 is a flowchart to show a process of selecting an optimum printer for each page and transmitting print data.

When a document print command is entered, the document features are analyzed for each page at step S41, as to whether or not the document contains color data, whether or not the document contains image data, the used font type, etc., and the analysis result is retained. Other information pieces entered by the user for printing, namely, user print conditions are also detected and retained in this step.

Figure 12A:
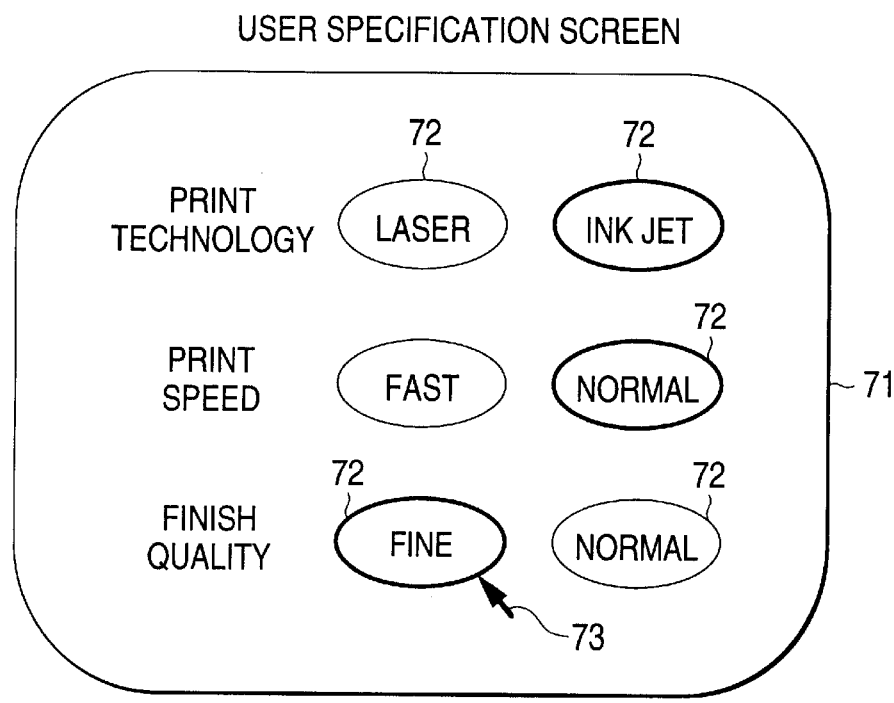
FIGS. 12a and 12b show schematic forms of a user interface.

Next, at step S42 it is determined whether or not the user specifies the document print method, namely, enters special specification as to printer selection. As shown in FIG. 12a, for example, buttons 72 are displayed on a screen 71 for the user to specify condition items of print speed, finish quality, etc. The user can activate each button 72 with a pointer 73, or the like, to give instructions as to printer selection, such as "fast" or "normal" for the print speed and "fine" or "normal" for the finish quality, for example, in an intuitively easy-to-understand form.

If it is determined at step S42 that printer selection conditions are specified, control goes to step S43 at which the printer selection conditions are stored. On the other hand, if it is determined at step S42 that printer selection conditions are not set, control goes to step S44 at which the printer state management table 51 is referenced at step S44. At step S45, an optimum printer is selected for each page based on the printer state management table 51 and user information. The selection process at step S45 will be described later with FIGS. 13–14.

Figure 12B:
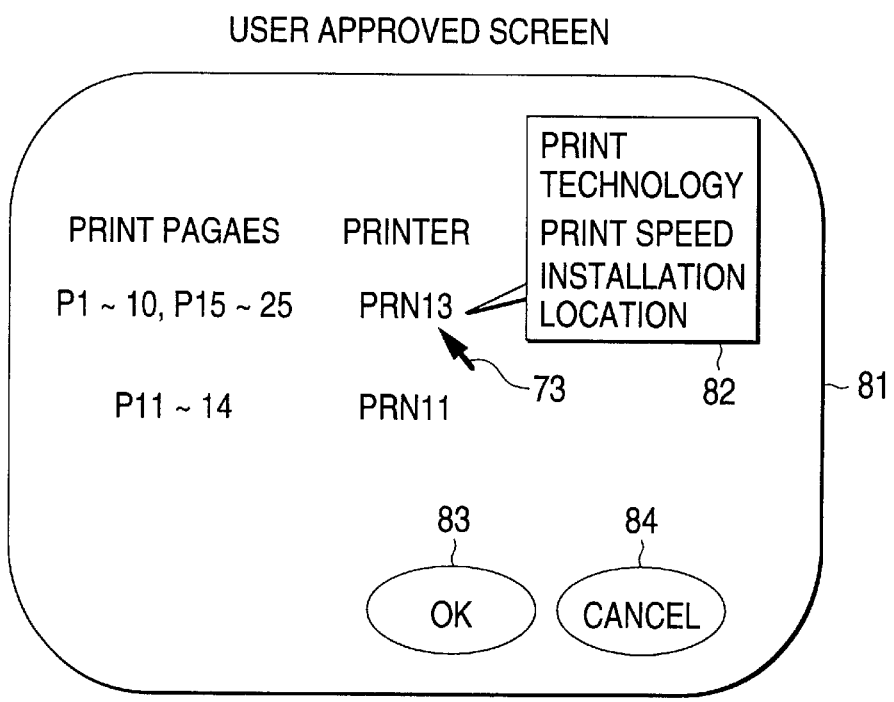

When an optimum printer is selected for each page, the selection result is shown on a display at step S46, and waits for the user to approve the selection result at step S47. FIG. 12b shows an example of a printer selection result report screen. The selected printers and pages to be printed at each printer are related and displayed on a screen 81.

FIG. 12b indicates that P1–P10 and P15–P25, 21 pages in total, are printed at printer PRN13 and P11–P14, 4 pages in total, are printed at printer PRN11. The user can also set the pointer 73 to a desired printer name and click thereon, thereby displaying summary information 82 of the printer. The summary information 82 can contain print technology, print speed, installation location, etc.

The user, who checks the printer selection result on the screen 81, can activate an OK button 83 or a CANCEL button 84 to notify his intention to approve or cancel the selected printer.

If the user does not approve, control returns to step S42 and steps S42–S46 are repeated. To again select printers from the beginning, the user can change the printer selection conditions at step S42.

If the user approves, YES is returned at step S47 and print data is generated by a predetermined printer driver 44 fitted to the selected printer at step S48. The print data generation process at step S48 will be described later with respect to FIG. 16. The generated print data is transmitted to the selected printers for printing.

Figure 13:
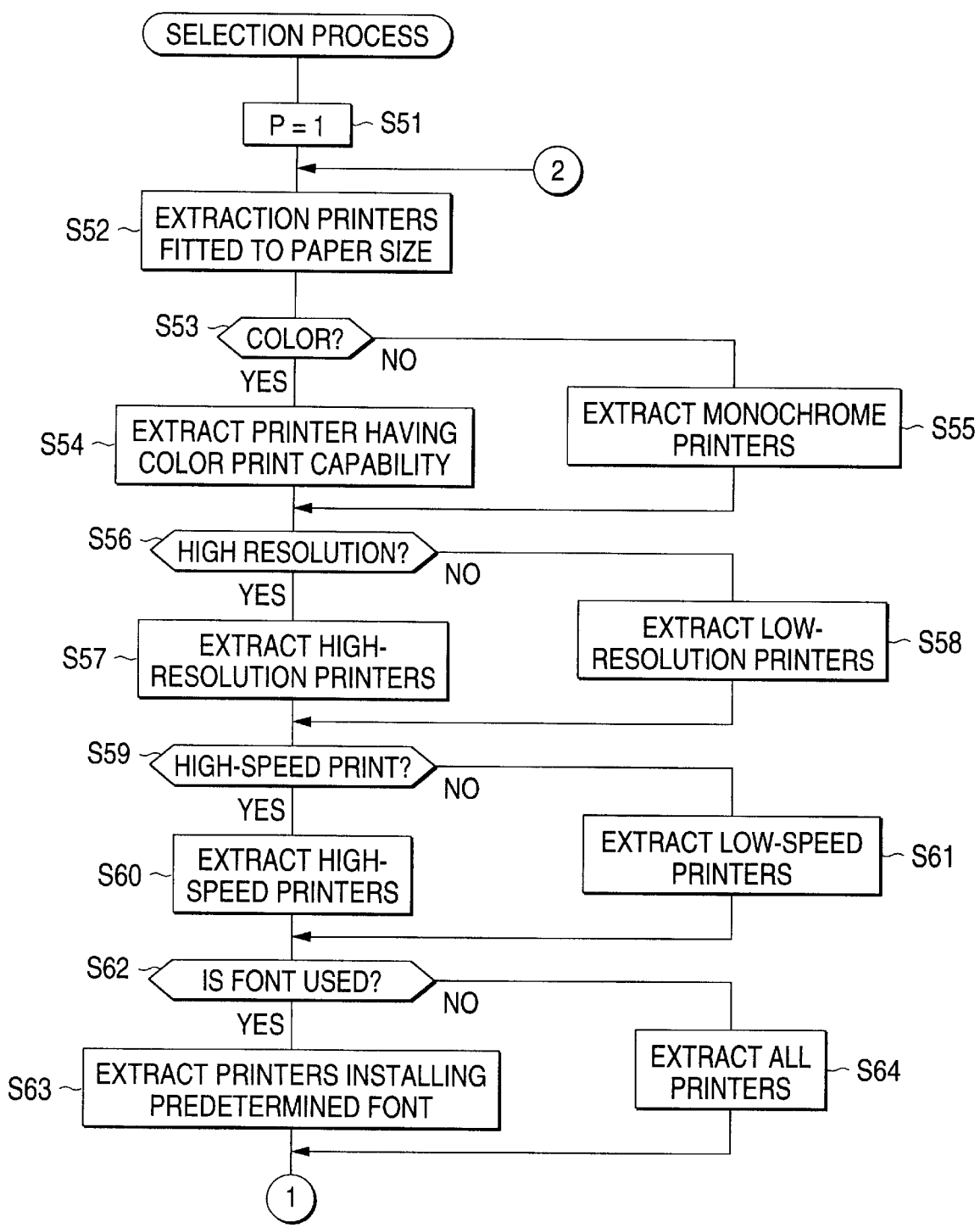
FIG. 13 is a flowchart to show a printer selection process to select an optimum printer for each print page.
Figure 14:
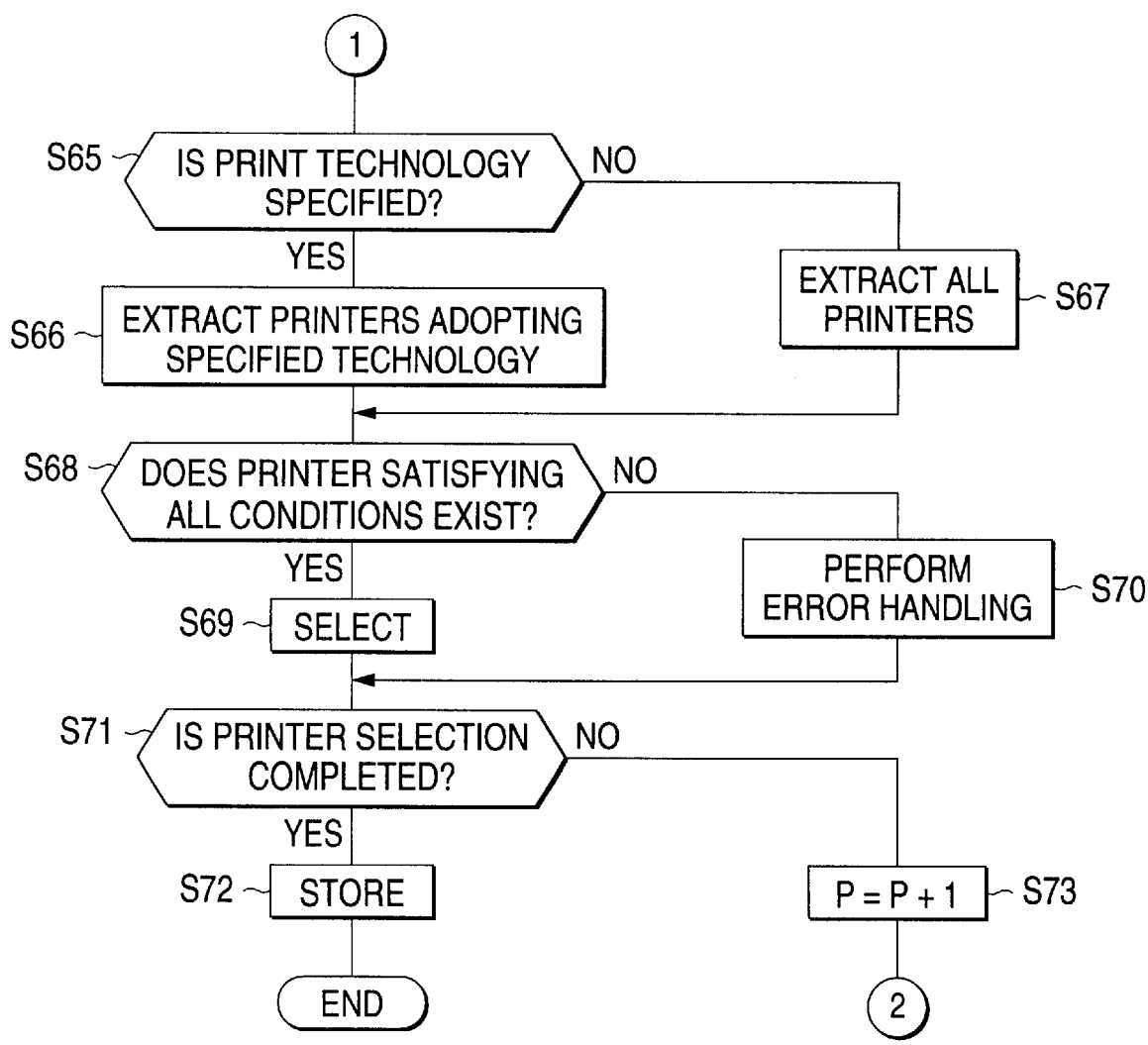
FIG. 14 is a printer selection process flowchart following FIG. 13.

Next, the selection process at step S45 in FIG. 11 will be discussed in detail. FIGS. 13 and 14 are flowcharts to show an example of the selection process. In the selection process, printers are extracted for each parameter, such as print color mode and print resolution, whereby the printer selection range is narrowed down and optimum printers are selected.

A print page count P is set to 1, so that printer selection is started at the first page of a given document at step S51. Next, printers fitted to the paper size, namely, printers comprising a predetermined fed paper size are extracted at step S52 by setting flag 1 in a determination table as described later.

Whether or not the page is a color print page is determined at step S53. If the page is a color print page, only printers having a color print capability are extracted at step S54. If the page is not a color print page, monochrome printers are extracted at step S55.

Next, whether or not high-resolution print is requested is determined at step S56. This can be determined by the resolution of image data contained in the print page, for example. If the user specifies fine finish quality of print, it can be determined that high-resolution print is requested. If high-resolution print is requested, high-resolution a printers are extracted at step S57; if high-resolution print is not requested, low-resolution printers are extracted at step S58. A reference value for determining whether print resolution is high or low is provided, whereby whether or not printers are high-resolution printers can be determined.

At step S59, whether or not high-speed print is requested is determined. Determination of a high-speed print request may be based on user specification. If the user does not enter a special specification, high-speed print can be set as a default value. To execute high-speed print, printers operating at high print speed are extracted at step S60; to not execute high-speed print, printers operating at low print speed are extracted at step S61. Whether or not printers are high-speed printers can be determined, for example, by providing a predetermined reference value.

At step S62, whether or not a particular printer font is to be used is determined. If a particular printer font is used for the print data transmitted from the print data generation system 41, it is necessary to select printers with the predetermined font installed. If a particular printer font is to be used, the printers having the predetermined font are extracted at step S63; if it is determined that a particular printer font is not required, all printers are extracted at step S64.

Next, at step S65 in FIG. 14, it is determined whether or not the user specifies a desired print technology. If the user specifies particular print technology, only printers adopting the specified print technology are extracted at step S66; if the user does not specify print technology, all printers are extracted at step S67.

At step S68, it is determined whether or not a printer satisfying all conditions of the print color mode, print resolution, etc., exists. If a printer satisfying all conditions exists, it is assigned to the print page at step S69. If a printer satisfying all conditions does not exist, error handling is performed at step S70. An example of error handling, would be displaying the unsatisfied conditions to inform the user. Printers that can be selected if certain conditions were changed may also be listed.

Whether or not printer selection is complete for all print pages of the document is determined at step S71. If selection of optimum printers is complete for all print pages, the print pages are sorted into the corresponding printers and stored at step S72. If printer selection is not complete for all print pages, the counter value P is incremented by one and control returns to step S52 for repeating the process.

In the description discussed above, if the page is not a color print page, monochrome printers are extracted; if high-resolution print is not requested, low-resolution printers are extracted; and if high-speed print is not requested, printers operating at low print speed are extracted. However, the invention is not limited to these default settings. For example, if the page is not a color print page, all printers may be extracted, because the color print function covers monochrome print. Likewise, the printers having a high-speed print capability can cover low-speed printers. However, to improve the performance of each printer, certain printers are selected for each function. For example, if color printers are also extracted for monochrome print, there is an increased chance that the color printer will be selected and thus, the possibility that print jobs will concentrate on specific printers is raised.

Figure 15:
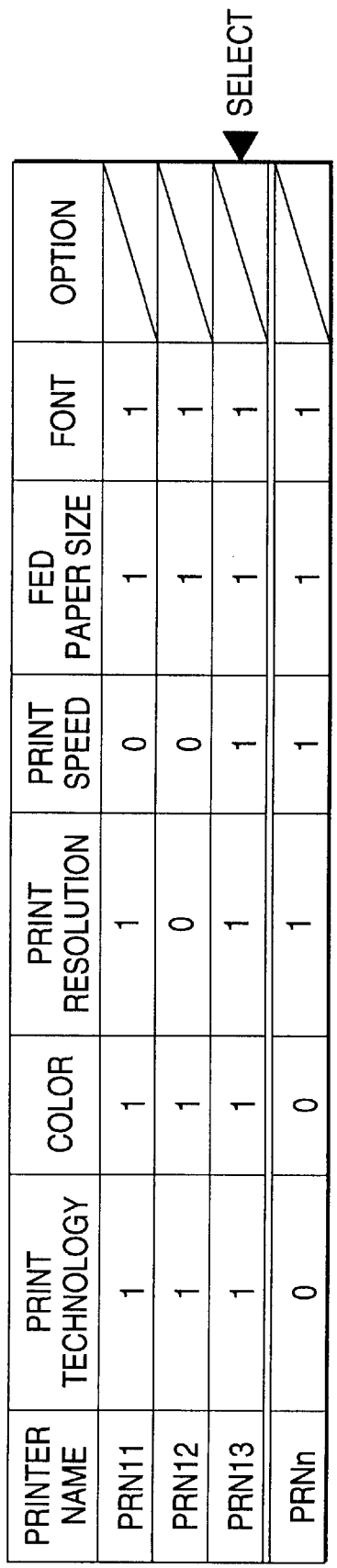
FIG. 15 is a schematic representation to show a determination table that can be used with the printer selection process.

Next, the above-mentioned determination table used with the printer selection process will be discussed with reference to FIG. 15. The determination table has a basic format similar to that of the printer state management table 51 shown in FIG. 9a.

For the printers satisfying the user print conditions of the print color mode, print resolution, etc., "1" is set in each of the corresponding condition items and "0" is set in each of the unsatisfied condition items. Therefore, the printer with "1" set in all condition items can be selected as an optimum printer for printing the print page. In the example shown in FIG. 15, the printer PRN 13 with "1" set in all condition items is selected as an optimum printer for printing.

An optimum printer can be selected promptly by using the determination table in the table format of the printer state management table 51. Since the determination result can be retained for each user criteria (user print condition, etc.,), printers that can be selected by changing the user print conditions, etc., can be detected easily.

Figure 16:
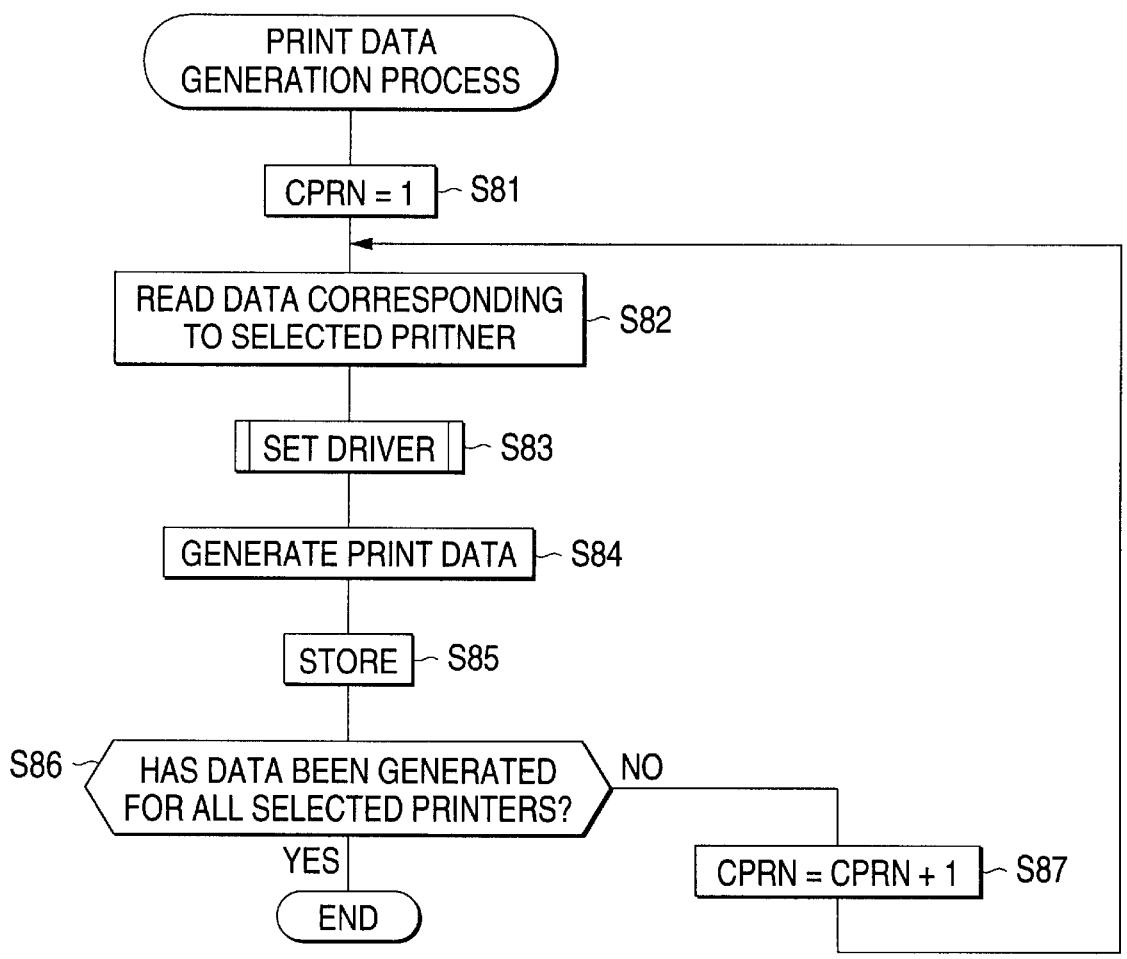
FIG. 16 is a flowchart to show a process for generating print data.

Next, the print data generation process at step S48 in FIG. 11 will be discussed with reference to a flowchart of FIG. 16. In the process, print data is generated for each selected printer.

A count CPRN to specify a selected printer is set to 1 at step S81 and all print pages to be printed at the printer specified by the count are read at step S82.

Next, the printer driver 44 corresponding to the specified printer is set at step S83. The core driver 44A calls the execution modules 44B required for the printer to execute print functions and loads the execution modules into memory, thereby configuring the optimum printer driver 44. Configuring of the printer driver 44 by the core driver 44A will be described later with FIG. 17, but the invention is not limited to it. For example, a normal printer driver may be read and set or a necessary printer driver may be transferred from a printer.

At step S84, print data is generated by the printer driver 44 thus configured dynamically; all print pages related to the printer are converted into data in the format that can be interpreted by the printer. To print page numbers, the print data is generated so that the page numbers match the initial page numbers defined in the document. The generated print data is stored in the storage section 47 at step S85.

Next, whether or not the print data has been generated for all selected printers is determined at step S86. If it is determined at step S86 that a printer for which print data is not generated remains, control goes to step S87 so that the count CPRN is incremented by one for specifying the next printer. Then, steps S82–S86 are repeated for generating and storing the print data for all selected printers.

Figure 17:
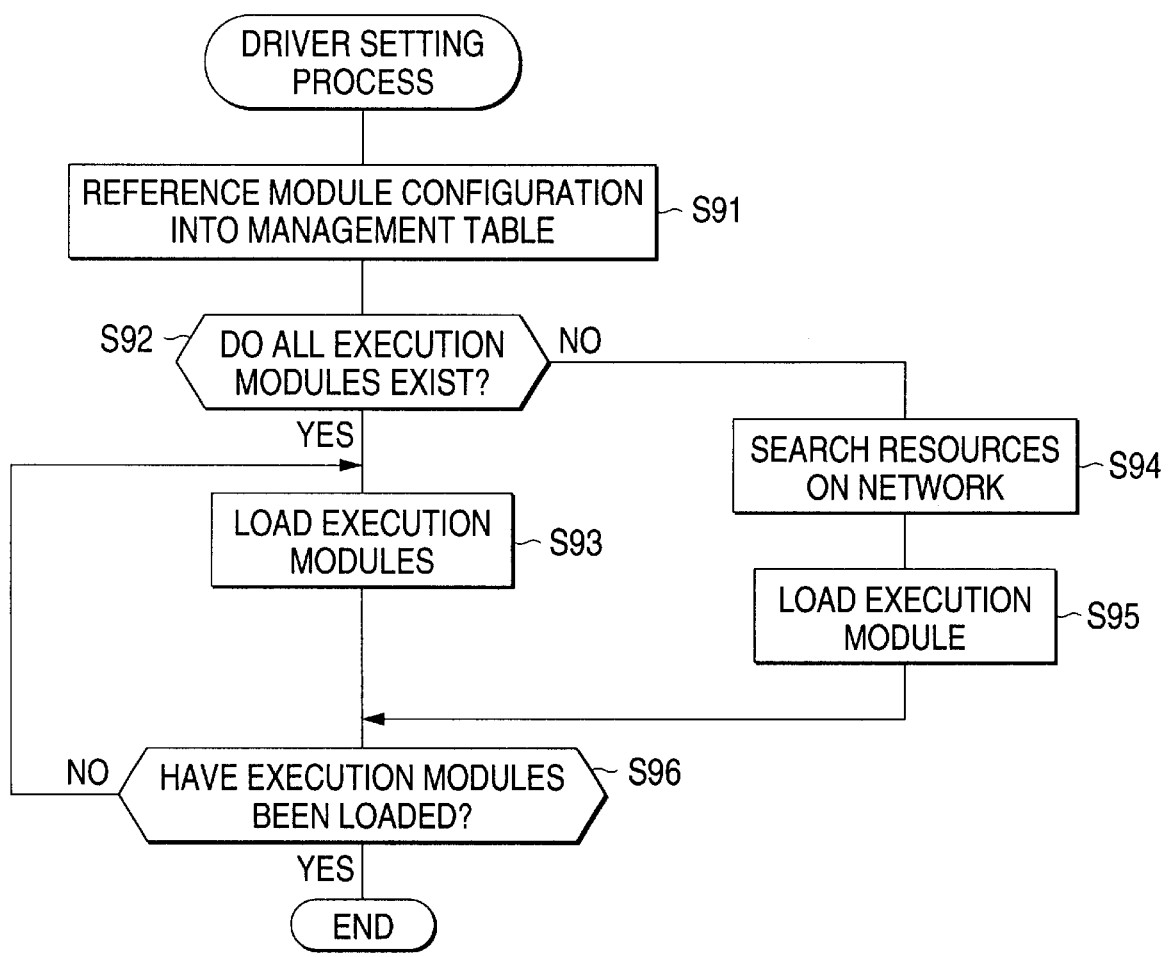
FIG. 17 is a flowchart to show a process for configuring a printer driver fitted to a selected printer.

FIG. 17 is a flowchart to show a driver setting process of the core driver 44A.

First, the core driver 44A references the module configuration information management table 52 with the selected printer as a retrieval key at step S91 and determines whether or not a complete set of the execution modules specified by the module configuration information on the printer is stored in the execution module group 53 in the storage section 50 at step S92. If all necessary execution modules are entered in the execution module group 53, the execution modules specified by the module configuration information are read from the execution module group 53 and loaded into memory at step S93.

On the other hand, if it is not determined at step S92 that the execution module group 53 comprises all necessary execution modules, control goes to step S94 at which the execution modules which are required, but not contained in the execution module group 53 are retrieved from resources on the network. Specifically, for example, whether or not a printer 61 connected to the network contains the execution module is inquired and if the printer 61 contains the execution module, a request for transferring the execution module is sent to the printer 61. The execution modules found on the network are loaded into the memory at step S95.

Whether all the execution modules specified by the module configuration information have been loaded into the memory is determined at step S96. If not all execution modules are loaded, control returns to step S93. When all the necessary execution modules have been thus loaded, the printer driver 44 optimum for the selected printer is configured.

The second embodiment provides the following advantages.

First, a printer appropriate for printing is selected for each print page and the print data generation means responsive to the printer is set, thus the user need not select a printer appropriate for printing for himself and ease of use improves drastically.

Second, an optimum printer is selected for each of print page groups into which print pages are sorted, thus an optimum print responsive to the print contents can be provided and the print efficiency also improves. In the first embodiment, if color data is contained in a part of a document, a color printer is selected even if the remaining part is monochrome data. However, the functions proper to a color printer are demonstrated only for pages containing color data. Therefore, the remaining monochrome data pages result in so-called overspecification and the print resources are wasted. Since all the document containing color data in a part concentrates on a specific printer, the whole print efficiency on the network lowers.

In contrast, in the second embodiment, an optimum printer is selected for printing each page, thus the functions of each printer can be used efficiently and print load can be distributed most effectively among the printers on the network.

Third, the core driver 44A calls necessary execution modules, thereby configuring the printer driver 44 fitted to the selected printer 61, thus it is not necessary to previously relate the printers and dedicated printer drivers to each other and operability and ease of use are improved drastically. The core driver 44A, which does not comprise a real body as a printer driver, can be assigned to the printers connected to the network in common. Therefore, the user is relieved of complicated preparation work of assigning dedicated printer drivers to printers. In other words, the core driver 44A is a dummy printer driver which does not have a real body on the print data generation function and the dummy core driver 44A enables driver setting work to be made hierarchical for omitting intricate setting work. This can be realized by using OLE (Object Linking and Embedding) technology developed by Microsoft Corporation USA™, for example. In this case, the core driver 44A becomes an OLE client application and the execution modules become OLE server applications.

Fourthly, an optimum printer driver 44 is configured by combining the appropriate execution modules required for using the print functions, thus the printer driver 44 fitted to each printer can be provided simply by replacing some execution modules. As the number of execution modules shared by different printers increases, the time taken in switching the printer driver 44 for one printer to that for another printer shortens. Therefore, if pages of a document are sorted into print page groups, an optimum printer driver 44 can be provided promptly.

Third Embodiment

Next, a third embodiment of the invention will be discussed. The third embodiment is characterized by the fact that the print data which takes longer to print is transmitted before the other data.

Figure 18:
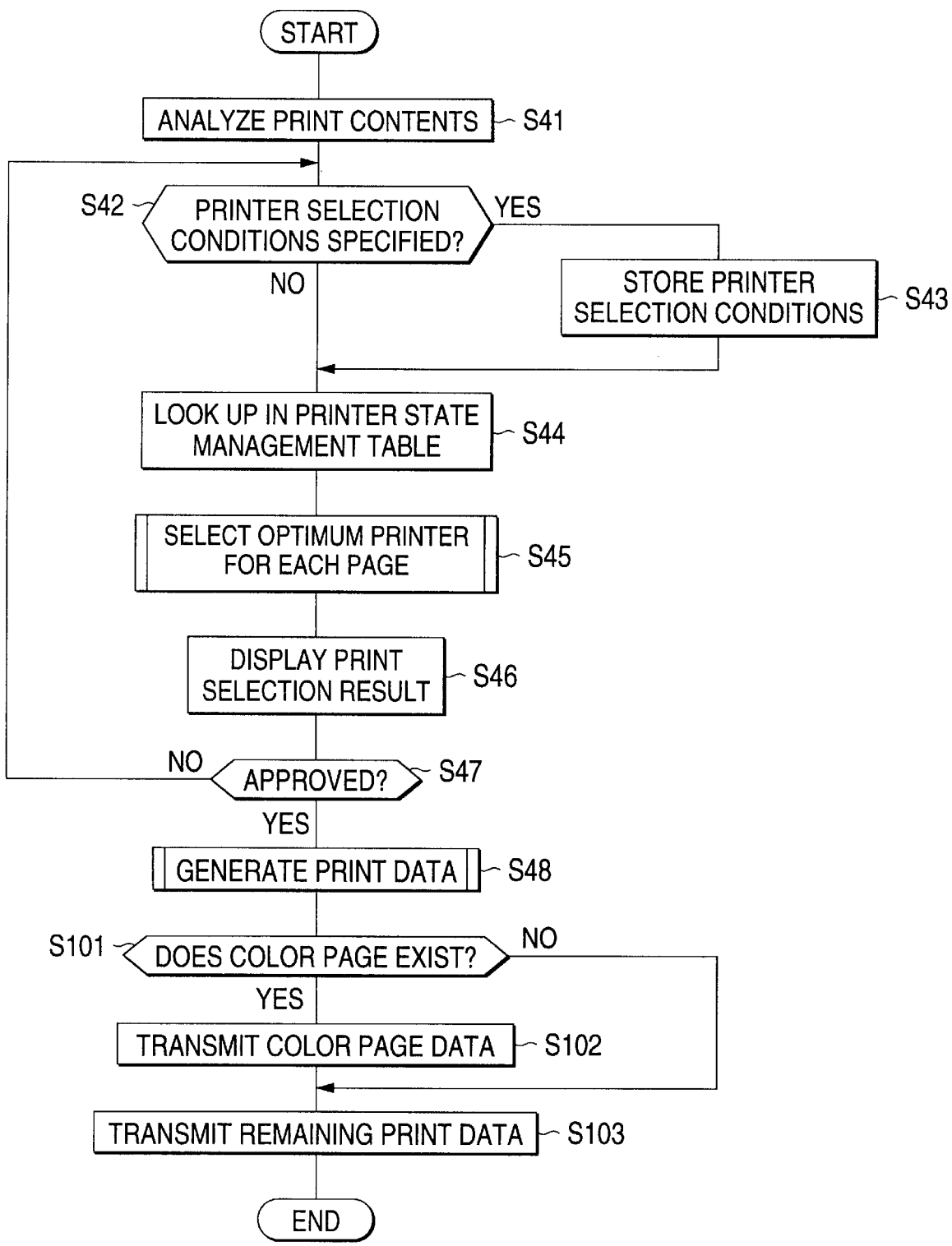
FIG. 18 is a flowchart to show whole print processing according to a third embodiment of the invention.

FIG. 18 is a flowchart to show whole print processing. Steps S41–S48 are the same as those shown in FIG. 11 and therefore will not be discussed again. Steps S101–S103 featuring the embodiment will be discussed.

When print data is generated at step S48, whether or not the print data contains color print data is determined at step S101. Color printing generally takes longer to print than monochrome data. If color print data is contained, it is transmitted preceding any other data at step S102. Next, the remaining print data is transmitted to the selected printer at step S103. If color print data is not contained, step S102 is skipped.

Therefore, according to the embodiment, the color print data to be printed at a color printer is transmitted preceding any other data, thus printing of data which requires longer print time can be started first and the print end time lag between printers can be lessened. For example, if image data high in print resolution exists, regardless of color or monochrome data, it can also be transmitted preceding any other data. To generate print data, a page to be printed at a color printer can also be converted into print data preceding other pages.

Fourth Embodiment

Next, a fourth embodiment of the invention will be discussed with reference to FIG. 19. The fourth embodiment is characterized by the fact that print data is generated for each print page rather than generated in batch for each printer and then is sorted into printers.

Figure 19:
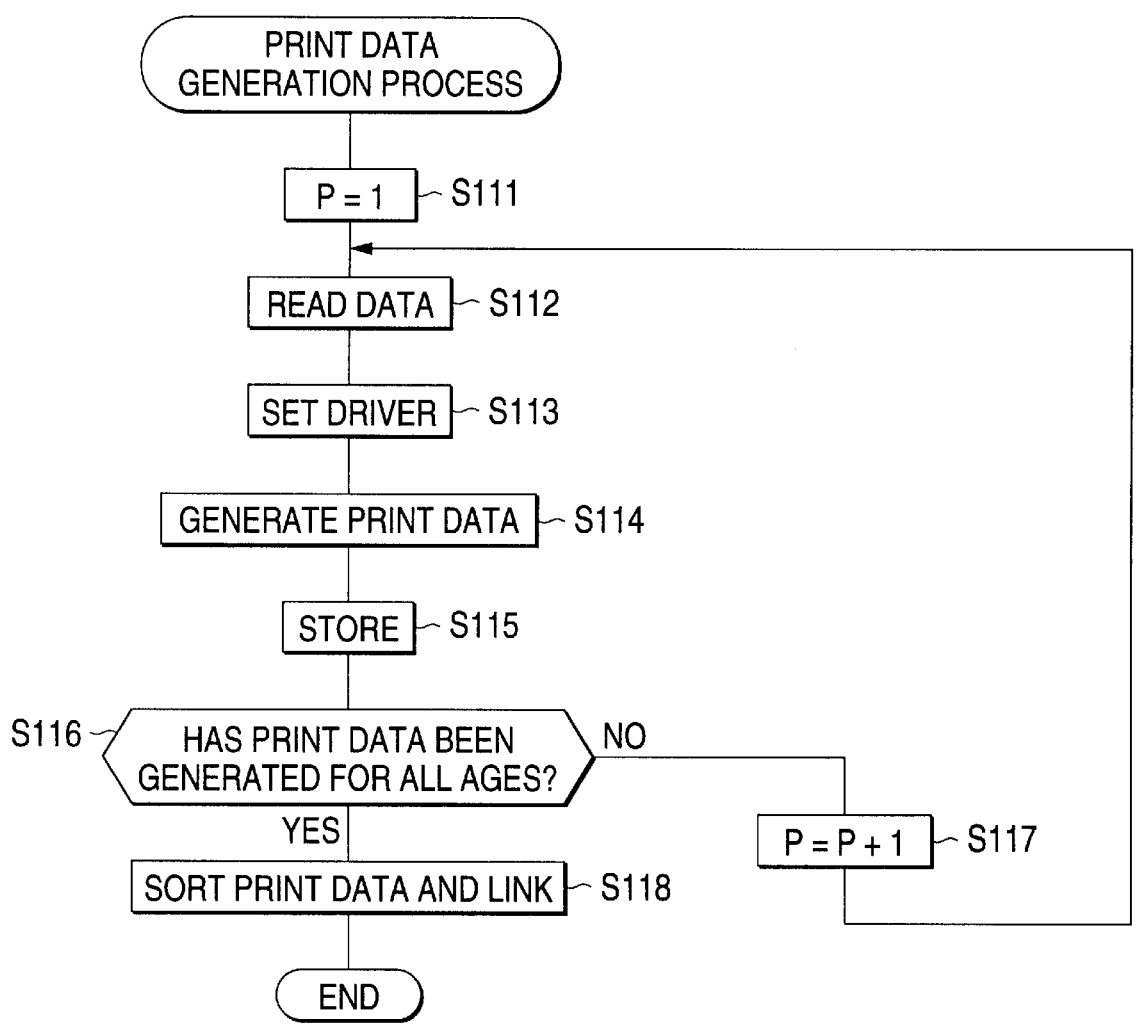
FIG. 19 is a flowchart to show a print data generation process according to a fourth embodiment of the invention.

FIG. 19 is a flowchart to show a print data generation process according to the embodiment.

First, count P for specifying the number of pages is set to 1 and the process is started at the first page at step S111.

Next, data of the specified print page is read at step S112 and a printer driver 44 corresponding to a printer selected to be optimum for printing the page is set at step S113. Print data is generated at step S114 and is stored in a storage section 47 at step S115.

Whether or not print data has been generated for all print pages is determined at step S116. If print data generation is not complete, the count P is incremented by one at step S117 and control returns to step S112. If print data has been generated for all print pages, it is sorted into printers and linked to form files at step S118.

The described embodiment can also provide advantages similar to those of the preceding embodiments. However, for example, in a document comprising color and monochrome print pages alternately, there is the possibility that processing will be delayed for the period of time required for the printer driver 44 to switch.

As many apparently widely different embodiments of this invention may be made without departing from the spirit and scope thereof, it is to be understood that the invention is not limited to the specific embodiments thereof.

Figure 6:
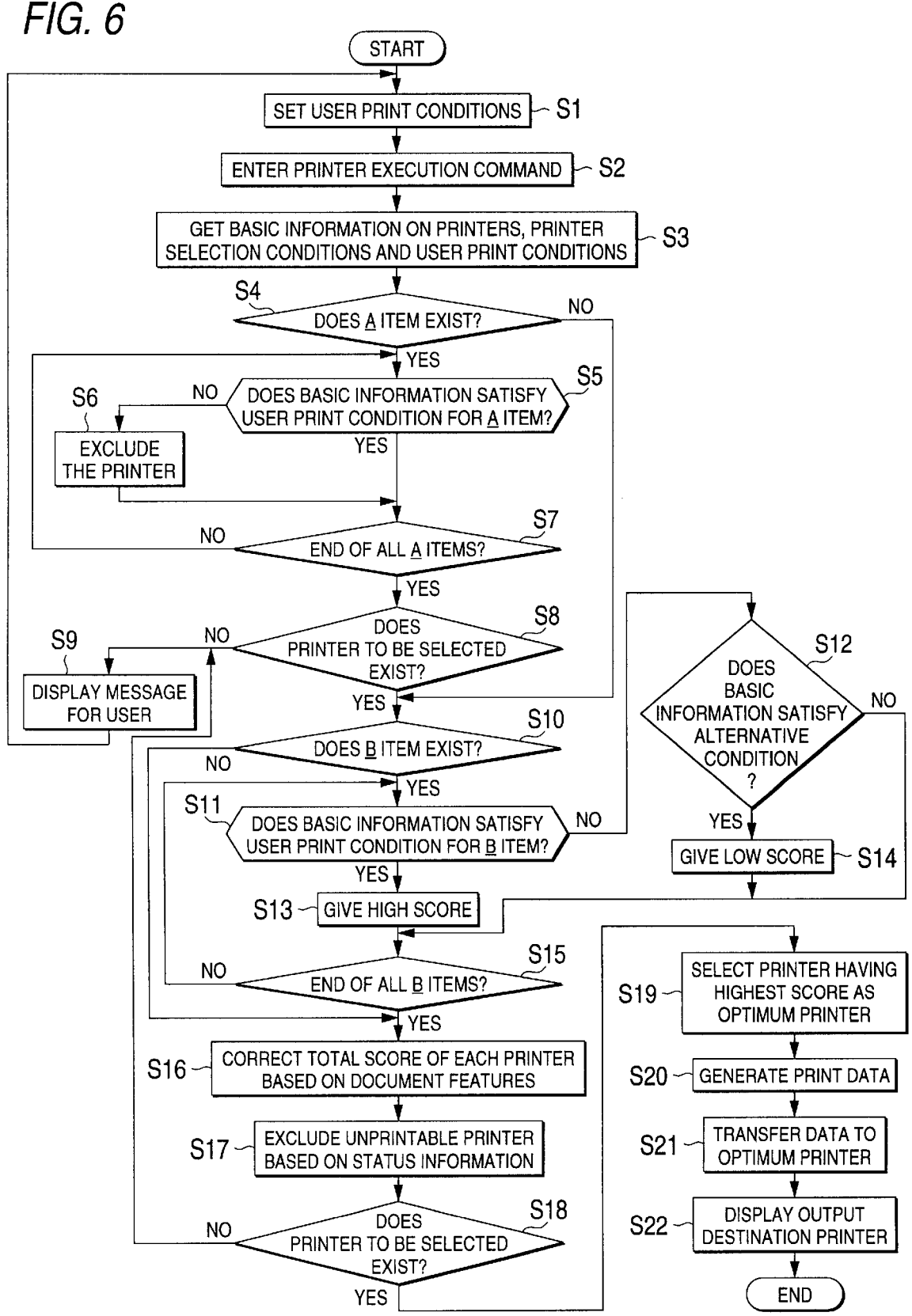
FIG. 6 is a flowchart to show print processing of the host computer.

The decision flow and technique for selecting an optimum printer shown in FIG. 6 are taken as a simple example for considering various pieces of information in total, such as user print conditions, printer selection conditions, basic information, status information, and document features. In addition to the example, those skilled in the art can easily make various modifications in the information checking order and manner, check result evaluation and correction, consider additional information not considered in the embodiments, provide selection based on types of information less than those in the embodiments, determine an optimum printer based on the check result, etc.

All processing modules in the host computer 1 shown in FIG. 1 do not need to be installed in each host computer 1. For example, the processing modules may be distributed to several host computers or at least some processing modules may be placed in the server 3 shown in FIG. 3. The basic information setting section 12 and the status monitor section 13 may be installed in the server 3, which may respond to a request from each host computer 1 with the basic information on the printers on the network and the status information thereof. Alternatively, the output destination printer selection section 11 as well as the basic information setting section 12 and the status monitor section 13 may be installed in the server 3, which may receive a request from each host computer 1, read the printer selection conditions, the user print conditions, and the document features sent from the host computer 1, selects an optimum printer, and informs the host computer 1 of the selected optimum printer. Further, more processing modules may be installed in the server 3. In summary, in the invention, it is not important which machine in the system the processing modules for printer selection are installed in and whether the processing modules are realized by software or hardware; the printer selection function may be provided in the form that can be used by each host computer in the entire system.

Further, for example, as shown in FIG. 8, all or some of the programs and data according to the invention are stored on a recording medium MM and the programs and data stored on the recording medium MM are loaded into the computer, whereby the invention can also be embodied. A physical recording medium, such as RAM, ROM, floppy disk, or CD-ROM, can be used as the recording medium MM. A communication medium can also be used so as to download programs and data through the network.

What is claimed is:

1. A printing system comprising:
   a plurality of printers;
   a host computer for selectively driving said plurality of printers;
   user information retention means for retaining user information concerning print data preset by a user before initiation of a printing operation, wherein said user information relates to general print preferences of the user independent of a particular print job;
   printer information retention means for retaining printer information concerning print environments of said plurality of printers, wherein said printer information includes status information comprising printing state, power saving state, error state, data amount waiting for print, paper size, paper type, remaining paper amount, remaining toner amount, and remaining ink amount, indicating a status of said plurality of printers; and
   printer selection means for selecting a printer from among said plurality of printers based on the user information retained in said user information retention means and the printer information retained in said printer information retention means and controlling said host computer so as to drive the selected printers.

2. The printing system as claimed in claim 1 wherein said user information retention means retains a user print condition set by the user, wherein
   said printer information retention means retains basic information indicating performance of said plurality of printers, and wherein
   said printer selection means selects a printer suitable for printing from among said plurality of printers having the basic information that can satisfy the user print condition.

3. The printing system as claimed in claim 1 wherein said user information retention means retains a printer selection condition set by the user, wherein
   said printer information retention means retains basic information indicating performance of said plurality of printers, and wherein
   said printer selection means selects a printer suitable for printing from among said plurality of printers having the basic information that can satisfy the printer selection condition.

4. The printing system as claimed in claim 1 wherein said user information retention means retains document feature information extracted from data of a document to be printed, wherein
   said printer information retention means retains basic information indicating performance of said plurality of printers, and wherein
   said printer selection means selects a printer suitable for printing from among said plurality of printers having the basic information that can satisfy requirements for printing the document based on the document feature information.

5. The printing system as claimed in claim 1 wherein said user information retention means retains a user print condition set by the user, wherein
   said printer in formation retention means retains the status information indicating the status of said plurality of printers, and wherein
   said printer selection means selects a printer suitable for printing from among said plurality of printers having the status information that can satisfy the user print condition.

6. The printing system as claimed in claim 1 wherein said user information retention means retains a printer selection condition set by the user, wherein
said printer information retention means retains the status information indicating the status of said plurality of printers, and wherein
said printer selection means selects a printer suitable for printing from among said plurality of printers having the status information that can satisfy the printer selection condition.

7. The printing system as claimed in claim 1 wherein said user information retention means retains document feature information extracted from data of a document to be printed, wherein
said printer information retention means retains the status information indicating the status of said plurality of printers, and wherein
said printer selection means selects a printer suitable for printing from among said plurality of printers having the status information that can satisfy requirements for printing the document based on the document feature information.

8. The printing system as claimed in claim 1 wherein said user information retention means retains a user print condition set by the user, wherein
said printer information retention means retains basic information indicating performance of said plurality of printers and the status information indicating the status thereof, and wherein
said printer selection means selects a printer suitable for printing from among said plurality of printers having the basic information and the status information that can satisfy the user print condition.

9. The printing system as claimed in claim 1 wherein said user information retention means retains a printer selection condition set by the user, wherein
said printer information retention means retains basic information indicating performance of said plurality of printers and the status information indicating the status thereof, and wherein
said printer selection means selects a printer suitable for printing from among said plurality of printers having the basic information and the status information that can satisfy the printer selection condition.

10. The printing system as claimed in claim 1 wherein said user information retention means retains document feature information extracted from data of a document to be printed, wherein
said printer information retention means retains basic information indicating performance of said plurality of printers and the status information indicating the status thereof, and wherein
said printer selection means selects a printer suitable for printing from among said plurality of printers having the basic information and the status information that can satisfy the printer selection condition.

11. The printing system as claimed in claim 1 wherein said user information retention means retains a user print condition and a printer selection condition set by the user, wherein
said printer information retention means retains basic information indicating performance of said plurality of printers, and wherein
said printer selection means selects a printer suitable for printing from among said plurality of printers having the basic information that can satisfy the user print condition and the printer selection condition.

12. The printing system as claimed in claim 1 wherein said user information retention means retains a user print condition set by the user and document feature information extracted from data of a document to be printed, wherein
said printer information retention means retains basic information indicating performance of said plurality of printers, and wherein
said printer selection means selects a printer suitable for printing from among said plurality of printers having the basic information that can satisfy the user print condition and satisfy requirements for printing the document based on the document feature information.

13. The printing system as claimed in claim 1 wherein said user information retention means retains a printer selection condition set by the user and document feature information extracted from data of a document to be printed, wherein
said printer information retention means retains basic information indicating performance of said plurality of printers, and wherein
said printer selection means selects a printer suitable for printing from among said plurality of printers having the basic information that can satisfy the printer selection condition and satisfy requirements for printing the document based on the document feature information.

14. The printing system as claimed in claim 1 wherein said user information retention means retains a user print condition and a printer selection condition set by the user and document feature information extracted from data of a document to be printed, wherein
said printer information retention means retains basic information indicating performance of said plurality of printers, and wherein
said printer selection means selects a printer suitable for printing from among said plurality of printers having the basic information that can satisfy the user print condition and the printer selection condition and satisfy requirements for printing the document based on the document feature information.

15. The printing system as claimed in claim 1 wherein said user information retention means retains a user print condition and a printer selection condition set by the user, wherein
said printer information retention means retains basic information indicating performance of said plurality of printers and the status information indicating the status thereof, and wherein
said printer selection means selects a printer suitable for printing from among said plurality of printers having the basic information and the status information that can satisfy the user print condition and the printer selection condition.

16. The printing system as claimed in claim 1 wherein said user information retention means retains a user print condition set by the user and document feature information extracted from data of a document to be printed, wherein
said printer information retention means retains basic information indicating performance of said plurality of printers and the status information indicating the status thereof, and wherein
said printer selection means selects a printer suitable for printing from among said plurality of printers having the basic information and the status information that can satisfy the user print condition and satisfy requirements for printing the document based on the document feature information.

17. The printing system as claimed in claim 1 wherein said user information retention means retains a printer selection condition set by the user and document feature information extracted from data of a document to be printed, wherein said printer information retention means retains basic information indicating performance of said plurality of printers and the status information indicating the status thereof, and wherein said printer selection means selects a printer suitable for printing from among said plurality of printers having the basic information and the status information that can satisfy the printer selection condition and satisfy requirements for printing the document based on the document feature information.

18. The printing system as claimed in claim 1 wherein said user information retention means retains a user print condition and a printer selection condition set by the user and document feature information extracted from data of a document to be printed, wherein said printer information retention means retains basic information indicating performance of said plurality of printers and the status information indicating the status thereof, and wherein said printer selection means selects a printer suitable for printing from among said plurality of printers having the basic information and the status information that can satisfy the user print condition and the printer selection condition and satisfy requirements for printing the document based on the document feature information.

19. The printing system as claimed in claim 1 further including a communication network having a plurality of nodes containing said plurality of printers and said host computer, wherein said user information retention means, said printer information retention means, and said printer selection means are arranged so as to concentrate on each node of said plurality of nodes or are distributed over said plurality of nodes.

20. The printing system as claimed in any of claims 1–19 wherein said printer selection means selects for each print page, a printer suitable for printing the print page.

21. The printing system as claimed in claim 20 wherein said host computer generates and transmits print data for each printer selected by said printer selection means.

22. The printing system as claimed in claim 21 wherein said host computer generates or transmits the print data, which takes a relatively long time to print compared to other print data, before the other print data.

23. A print data generation system comprising:

printer control means that can selectively drive a plurality of printers;

user information retention means for retaining user information concerning print data preset by a user before initiation of a printing operation, wherein said user information relates to general print preferences of the user independent of a particular print job;

printer information retention means for retaining printer information concerning print environments of said plurality of printers, wherein said printer information includes status information comprising printing state, power saving state, error state, data amount waiting for print, paper size, paper type, remaining paper amount, remaining toner amount, and remaining ink amount, indicating a status of said plurality of printers; and printer selection means for selecting a printer suitable for printing from among said plurality of printers based on the user information retained in said user information retention means and the printer information retained in said printer information retention means, wherein said printer control means drives the printer selected by said printer selection means.

24. The print data generation system as claimed in claim 23 wherein said user information retention means retains a user print condition set by the user, wherein said printer information retention means retains basic information indicating performance of said plurality of printers, and wherein said printer selection means selects a printer suitable for printing from among said plurality of printers having the basic information that satisfy the user print condition.

25. The print data generation system as claimed in claim 23 wherein said user information retention means retains a printer selection condition set by the user, wherein said printer information retention means retains basic information indicating performance of said plurality of printers, and wherein said printer selection means selects a printer suitable for printing from among said plurality of printers having the basic information that satisfy the printer selection condition.

26. The print data generation system as claimed in claim 23 wherein said user information retention means retains document feature information extracted from data of a document to be printed, wherein said printer information retention means retains basic information indicating performance of said plurality of printers, and wherein said printer selection means selects a printer suitable for printing from among said plurality of printers having the basic information that satisfies requirements for printing the document based on the document feature information and the basic information.

27. The print data generation system as claimed in claim 23 wherein said user information retention means retains a user print condition set by the user, wherein said printer information retention means retains the status information indicating the status of said plurality of printers, and wherein said printer selection means selects a printer suitable for printing from among the plurality of printers having the status information that satisfy the user print condition.

28. The print data generation system as claimed in claim 23 wherein said user information retention means retains a printer selection condition set by the user, wherein said printer information retention means retains the status information indicating the status of said plurality of printers, and wherein said printer selection means selects a printer suitable for printing from among said plurality of printers having the status information that satisfy the printer selection condition.

29. The print data generation system as claimed in claim 23 wherein said user information retention means retains document feature information extracted from data of a document to be printed, wherein said printer information retention means retains the status information indicating the status of said plurality of printers, and wherein said printer selection means selects a printer suitable for printing from among said plurality of printers having the status information that satisfies requirements for printing the document based on the document feature information and the status information.

30. The print data generation system as claimed in claim 23 wherein said user information retention means retains a user print condition set by the user, wherein said printer information retention means retains basic information indicating performance of said plurality of printers and the status information indicating the status thereof, and wherein said printer selection means selects a printer suitable for printing from among said plurality of printers having the basic information and the status information that satisfy the user print condition based on the user print condition, the basic information, and the status information.

31. The print data generation system as claimed in claim 23 wherein said user information retention means retains a printer selection condition set by the user, wherein said printer information retention means retains basic information indicating performance of said plurality of printers and the status information indicating the status thereof, and wherein said printer selection means selects a printer suitable for printing from among said plurality of printers having the basic information and the status information that satisfy the printer selection condition based on the printer selection condition, the basic information, and the status information.

32. The print data generation system as claimed in claim 23 wherein said user information retention means retains document feature information extracted from data of a document to be printed, wherein said printer information retention means retains basic information indicating performance of said plurality of printers and the status information indicating the status thereof, and wherein said printer selection means selects a printer suitable for printing from among said plurality of printers having the basic information and the status information that satisfy requirements for printing the document based on the document feature information, the basic information, and the status information.

33. The print data generation system as claimed in claim 23 wherein said user information retention means retains a user print condition and a printer selection condition set by the user, wherein said printer information retention means retains basic information indicating performance of said plurality of printers, and wherein said printer selection means selects a printer suitable for printing from among said plurality of printers having the basic information that satisfy the user print condition and the printer selection condition based on the user print condition, the printer selection condition, and the basic information.

34. The print data generation system as claimed in claim 23 wherein said user information retention means retains a user print condition set by the user and document feature information extracted from data of a document to be printed, wherein said printer information retention means retains basic information indicating performance of said plurality of printers, and wherein said printer selection means selects a printer suitable for printing from among said plurality of printers having the basic information that satisfy the user print condition and matches a capability of printing the document based on the user print condition, the document feature information, and the basic information.

35. The print data generation system as claimed in claim 23 wherein said user information retention means retains a printer selection condition set by the user and document feature information extracted from data of a document to be printed, wherein said printer information retention means retains basic information indicating performance of said plurality of printers, and wherein said printer selection means selects a printer suitable for printing from among said plurality of printers having the basic information that satisfy the printer selection condition and matches a capability of printing the document based on the printer selection condition, the document feature information, and the basic information.

36. The print data generation system as claimed in claim 23 wherein said user information retention means retains a user print condition and a printer selection condition set by the user and document feature information extracted from data of a document to be printed, wherein said printer information retention means retains basic information indicating performance of said plurality of printers, and wherein said printer selection means selects a printer suitable for printing from among said plurality of printers having the basic information that can satisfy the user print condition and the printer selection condition and matches a capability of printing the document based on the user print condition, the printer selection condition, the document feature information, and the basic information.

37. The print data generation system as claimed in claim 23 wherein said user information retention means retains a user print condition and a printer selection condition set by the user, wherein said printer information retention means retains basic information indicating performance of said plurality of printers and the status information indicating the status thereof, and wherein said printer selection means selects a printer suitable for printing from among said plurality of printers having the basic information and the status information that can satisfy the user print condition and the printer selection condition based on the user print condition, the printer selection condition, the basic information, and the status information.

38. The print data generation system as claimed in claim 23 wherein said user information retention means retains a user print condition set by the user and document feature information extracted from data of a document to be printed, wherein said printer information retention means retains basic information indicating performance of said plurality of printers and the status information indicating the status thereof, and wherein said printer selection means selects a printer suitable for printing from among said plurality of printers having the basic information and the status information that can satisfy the user print condition and matches a capability of printing the document based on the user print condition, the document feature information, the basic information, and the status information.

39. The print data generation system as claimed in claim 23 wherein said user information retention means retains a printer selection condition set by the user and document feature information extracted from data of a document to be printed, wherein said printer information retention means retains basic information indicating performance of said plurality of printers and the status information indicating the status thereof, and wherein said printer selection means selects a printer suitable for printing from among said plurality of printers having the basic information and the status information that can satisfy the printer selection condition and matches a capability of printing the document based on the printer selection condition, the document feature information, the basic information, and the status information.

40. The print data generation system as claimed in claim 23 wherein said user information retention means retains a user print condition and a printer selection condition set by the user and document feature information extracted from data of a document to be printed, wherein said printer information retention means retains basic information indicating performance of said plurality of printers and the status information indicating the status thereof, and wherein said printer selection means selects a printer suitable for printing from among said plurality of printers having the basic information and the status information that can satisfy the user print condition and the printer selection condition and matches a capability of printing the document based on the user print condition, the printer selection condition, the document feature information, the basic information, and the status information.

41. The print data generation system as claimed in any of claims 23–40 wherein said printer selection means selects for each print page, a printer suitable for printing the print page.

42. The print data generation system as claimed in claim 41 wherein said printer control means generates and transmits print data for each printer selected by said printer selection means.

43. The print data generation system as claimed in claim 42 wherein said printer control means generates or transmits the print data, which takes a relatively long time to print compared to other print data, before the other print data.

44. A printing method comprising the steps of:

obtaining user information concerning print data set by a user, wherein the user information is preset by the user and at least a portion of the user information is independent of a print job;

obtaining printer information concerning print environments of a plurality of printers, wherein said printer information includes status information comprising printing state, power saving state, error state, data amount waiting for print, paper size, paper type, remaining paper amount, remaining toner amount, and remaining ink amount, indicating a status of said plurality of printers;

selecting a printer suitable for printing from among said plurality of printers based on the user information and the printer information;

generating print data responsive to the selected printer; and transmitting the generated print data to the selected printer.

45. A printing method comprising the steps of:

obtaining a user print condition and user information concerning print data set by a user, wherein the user information is preset by the user and at least a portion of the user information is independent of a print job;

obtaining a printer selection condition set by the user;

obtaining printer information concerning print environments of a plurality of printers, wherein said printer information includes status information comprising printing state, power saving state, error state, data amount waiting for print, paper size, paper type, remaining paper amount, remaining toner amount, and remaining ink amount, indicating a status of said plurality of printers;

selecting a printer suitable for printing from among said plurality of printers having basic information that can satisfy the user print condition and the printer selection condition;

generating print data responsive to the selected printer; and transmitting the generated print data to the selected printer.

46. A recording medium recording a program for a computer comprising:

a user information retention function of retaining user information concerning print data set by a user, wherein the user information is preset by the user and at least a portion of the user information is independent of a print job;

a printer information retention function of retaining printer information concerning print environments of a plurality of printers, wherein said printer information includes status information comprising printing state, power saving state, error state, data amount waiting for print, paper size, paper type, remaining paper amount, remaining toner amount, and remaining ink amount, indicating a status of said plurality of printers;

a printer selection function of selecting a printer suitable for printing from among said plurality of printers based on the user information retained in said user information retention function and the printer information retained in said printer information retention function; and a printer control function of driving the printer selected by said printer selection function in a format that is read and understood by said computer.

47. The recording medium as claimed in claim 46 wherein said user information retention function retains at least any one of (a1) a user print condition set by the user;

(a2) a printer selection condition set by the user; or (a3) document feature information extracted from data of a document to be printed, and wherein said printer information retention function retains at least either:

(b1) basic information indicating performance of said plurality of printers; or (b2) the status information indicating the status of said plurality of printers.

48. A printer driver comprising:

a controller that can selectively drive a plurality of printers;

a first memory for retaining user information concerning print data set by a user, wherein the user information is preset by the user and at least a portion of the user information is independent of a print job;

a second memory for retaining printer information concerning print environments of said plurality of printers, wherein said printer information includes status information comprising printing state, power saving state, error state, data amount waiting for print, paper size, paper type, remaining paper amount, remaining toner amount, and remaining ink amount, indicating a status of said plurality of printers; and a selector for selecting a printer having the printer information that can satisfy the user information from among said plurality of printers based on the user information retained in said first memory and the printer information retained in said second memory, wherein said controller transmits print data to the selected printer and drives the selected printer.

* * * * *